United States Patent
Dobbie et al.

(10) Patent No.: US 6,931,668 B2
(45) Date of Patent: Aug. 23, 2005

(54) HEADMOUNT APPARATUS FOR ATTACHING AND SUPPORTING DEVICES

(75) Inventors: Blair R. Dobbie, Roanoke, VA (US); Charles D. Willey, Roanoke, VA (US); Steven A. Brillhart, Moneta, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 344 days.

(21) Appl. No.: 10/024,346

(22) Filed: Dec. 21, 2001

(65) Prior Publication Data

US 2003/0115661 A1 Jun. 26, 2003

(51) Int. Cl.$^7$ ............................... A42B 1/24; F41H 1/04
(52) U.S. Cl. ................................. 2/422; 2/6.1
(58) Field of Search ............................ 2/DIG. 11, 452, 2/416, 417, 418, 419, 420, 421, 422, 426, 6.1, 6.2, 6.3, 6.6, 414; 224/181, 271, 930, 908, 909; 359/815, 409; 362/105, 106; 128/207.11, 207.17

(56) References Cited

U.S. PATENT DOCUMENTS

| | | | | |
|---|---|---|---|---|
| 581,129 A | * | 4/1897 | Nevius ........................ 362/105 |
| 1,023,285 A | * | 4/1912 | White ................................ 2/9 |
| 1,112,358 A | * | 9/1914 | Cline ................................ 2/9 |
| 1,356,708 A | * | 10/1920 | Goodyear ................... 351/156 |
| 1,387,307 A | * | 8/1921 | Pohlmann ........................... 2/9 |
| 1,665,386 A | * | 4/1928 | Walmer ............................. 2/9 |
| 2,418,376 A | * | 4/1947 | Turner .............................. 2/9 |
| 2,616,081 A | * | 11/1952 | Weaver et al. ..................... 2/9 |
| 2,785,404 A | * | 3/1957 | Strohm .......................... 2/412 |
| 3,789,428 A | * | 2/1974 | Martin .............................. 2/9 |
| 3,878,563 A | * | 4/1975 | Pulju ................................ 2/9 |
| 4,457,461 A | * | 7/1984 | Docking et al. ............. 224/181 |
| 4,494,251 A | * | 1/1985 | Ainsworth et al. ............ 2/425 |
| 4,703,879 A |   | 11/1987 | Kastendieck et al. |
| 4,766,610 A | * | 8/1988 | Mattes .......................... 2/414 |
| 5,200,827 A | * | 4/1993 | Hanson et al. ........... 348/216.1 |
| 5,307,204 A | * | 4/1994 | Dor ............................. 359/400 |
| 5,471,678 A | * | 12/1995 | Dor ................................ 2/6.7 |
| 5,495,364 A |   | 2/1996 | Palmer |
| 5,537,261 A |   | 7/1996 | Palmer |
| 5,572,749 A |   | 11/1996 | Ogden |
| 5,608,918 A |   | 3/1997 | Salvaggio |
| 5,621,424 A |   | 4/1997 | Shimada et al. |
| 5,636,383 A |   | 6/1997 | Cwiakala |
| 5,670,970 A |   | 9/1997 | Yamazaki |
| 5,786,932 A |   | 7/1998 | Pniel |
| 5,801,885 A |   | 9/1998 | Togino |
| 5,808,801 A |   | 9/1998 | Nakayama et al. |
| 5,812,224 A |   | 9/1998 | Maeda et al. |
| 5,857,599 A |   | 1/1999 | Palmer |
| 6,009,562 A |   | 1/2000 | Bullock et al. |
| 6,012,164 A | * | 1/2000 | Deal, III ............................ 2/9 |
| 6,040,945 A |   | 3/2000 | Karasawa |
| 6,052,832 A |   | 4/2000 | Crompton |
| D433,411 S |   | 11/2000 | Kawashima |
| 6,212,020 B1 | * | 4/2001 | Ahlgren et al. ............. 359/815 |
| 6,256,798 B1 |   | 7/2001 | Egolf et al. |
| 6,467,099 B2 | * | 10/2002 | Dennis et al. ................. 2/455 |
| 6,499,147 B2 | * | 12/2002 | Schiebl et al. ................. 2/425 |

* cited by examiner

Primary Examiner—Rodney M. Lindsey
(74) Attorney, Agent, or Firm—Hunton & Williams LLP

(57) ABSTRACT

A headmount apparatus for mounting vision enhancement equipment thereon which is comprised of a mounting shell having at least one pad and having at least one mounting surface to which the vision enhancing equipment is mounted, where at least one pad is configured to contact the user's head. The headmount apparatus is also comprised of at least one elastic strap which is attached to the mounting shell for securing the mounting shell to the user's head. The headmount apparatus for mounting vision enhancement equipment thereon could alternatively be comprised of at least one mounting frame for attaching vision enhancement equipment, at least one hardware mounting surface for accepting the mounting frame, and a hood configured to fit over a user's head where the hood is made at least in part from an elastic material and which contains the hardware mounting surface.

21 Claims, 21 Drawing Sheets

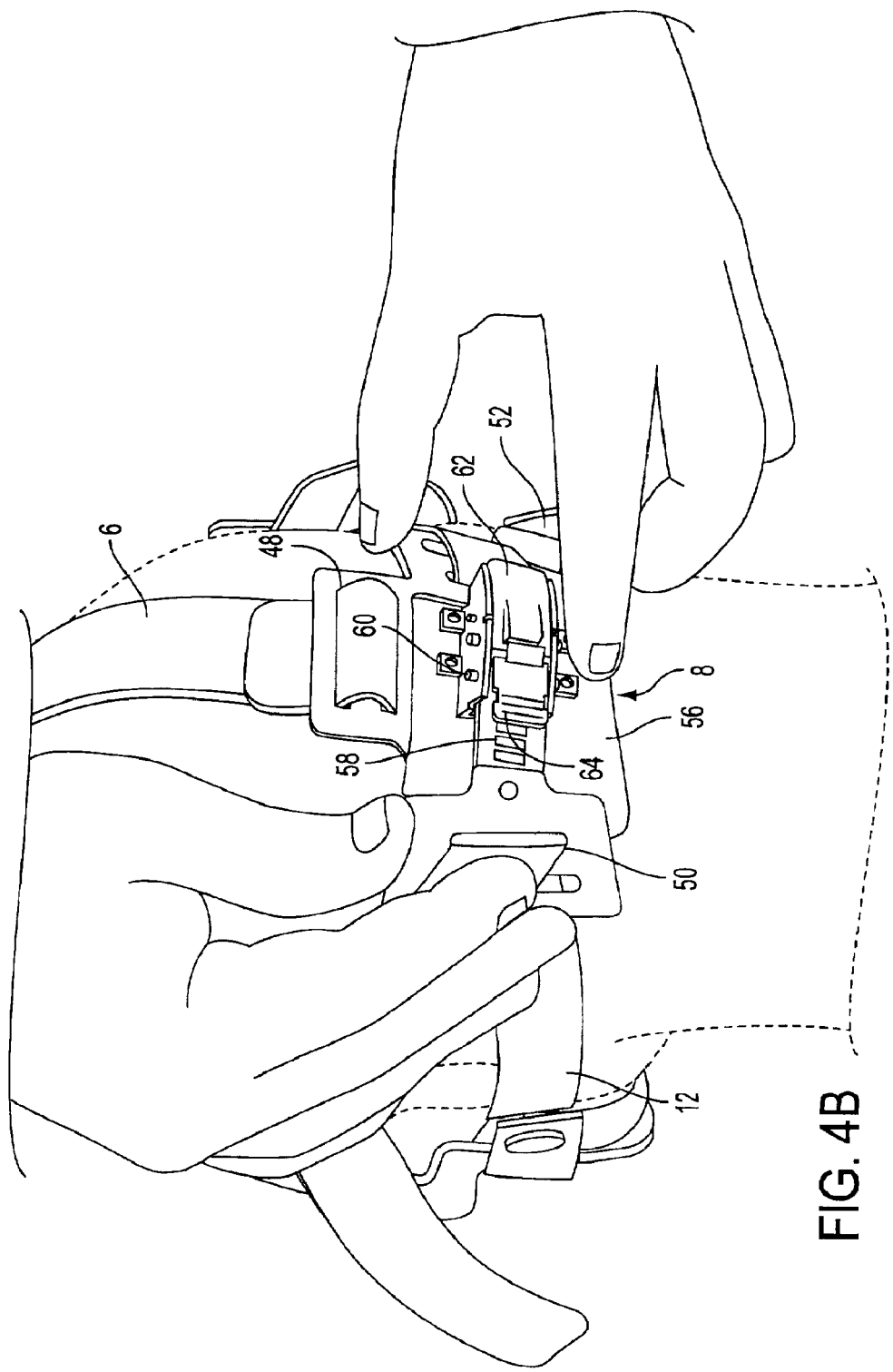

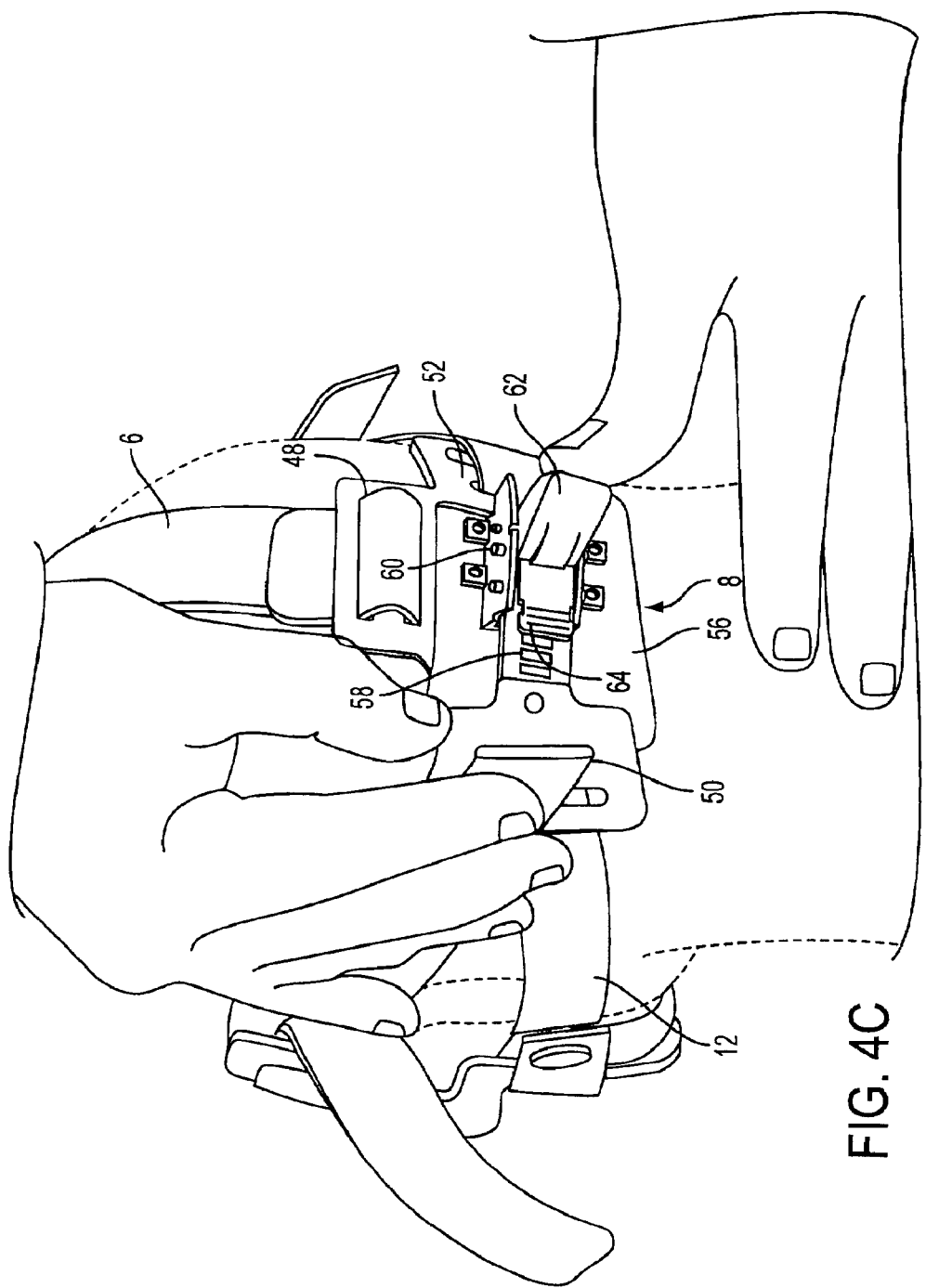

HEADMOUNT APPARATUS FOR ATTACHING AND SUPPORTING DEVICES

FIELD OF THE INVENTION

The present invention relates to a headmount apparatus configured to fixably receive and support devices, such as for use in mounting vision enhancing equipment.

BACKGROUND OF THE INVENTION

There are known headmount devices for attaching and supporting vision enhancing equipment, commonly used to free the hands of the user or otherwise provide ease and efficiency of use and enhanced activity. Such vision enhancing equipment includes night vision goggles, binoculars, prescription or protective lenses, microscopic lenses and similar devices. These vision enhancing devices are utilized for example, in a variety of military and commercial applications where enhanced vision during low light or night conditions is desirable, or to perform microscopic surgery. The operation and mounting of certain vision enhancing equipment is disclosed in U.S. Pat. No. 5,857,599 entitled MOUNTING BRACKET ASSEMBLY FOR A NIGHT VISION DEVICE issued to Gary L. Palmer on Jan. 12, 1999 (also see U.S. Pat. No. 5,495,364 entitled NIGHT VISION BINOCULARS issued to Gary L. Palmer on Feb. 27, 1996, and U.S. Pat. No. 5,537,261 entitled NIGHT VISION BINOCULARS issued to Gary L. Palmer on Jul. 16, 1996).

One of the purposes for employing headmount equipment is to suspend the vision enhancing equipment, which typically weighs 0.3–0.9 kg, in front of the user's eye(s). Suspending the vision enhancing equipment in front of the user's eye(s) leaves his hands free to operate or manipulate other equipment. Additionally, the headmount equipment should serve to minimize the relative motion between the device and the user's eye(s). By minimizing this relative motion, the user's head movement does not prevent the image projected by the system from being seen by the user.

Common headmounts consist of a harness which grabs the user's head, a platform that distributes the load attached to the headmount equipment, and single or multiple links which attach the vision enhancing device to the platform. Conventional harness configurations utilize adjustable straps to tightly bind the platform to the user's head. One problem with the conventional harness configurations is that the degree to which the harness maintains the position of the vision enhancing device in front of the user's eye(s) is determined by the tightness of its adjustable straps.

Another problem with the prior art headmounts is that they are difficult to adjust. For example, when a user positions the platform on their head, they typically place and hold it in position with one hand, and use the other hand to roughly adjust the straps. And then once the straps are tightened enough so as to suspend the vision enhancing equipment in front of the user's face, the user needs to employ both hands to adjust the tension and length of all the straps until the harness is properly fitted. As evident from the above description, adjustment of the straps while the platform is on the user's head is difficult. Additionally, the straps used to bind the platform to the user's head are typically hard to operate. In particular, the straps must be loosened in the buckle before they can actually be tightened. Moreover, the buckles often interfere with the comfort of the user since they impinge on the user's cranium.

Another shortcoming associated with typical headmount equipment is the fact that the conventional vision enhancing equipment attached to the headmount equipment is often heavy and cantilevered away from the support out over the user's line of sight. This cantilevering requires a great deal of tension to reliably hold the system in position, which results in constriction of the user's cranium. This constriction in turn causes a whole range of deleterious side-effects. For example, the constriction of the user's cranium might cause initial discomfort which could increase over time and could result in pain.

Such discomfort and/or pain impedes the user's situational awareness by distracting him or causing fatigue and could provoke the user to remove the headmount equipment to alleviate the pain. Because headaches resulting from such pain may last for hours, the typical headmount system actually causes the user to not employ the vision enhancement system since he cannot bear the pain associated with its use.

Moreover, because the headmount equipment is often used in adverse situations, it is commonly worn in conjunction with a helmet. However, the straps and buckles used to keep the platform properly positioned are often bulky. And because of this bulkiness, the headmount may not be compatible with other head-mounted equipment such as a helmet, because the straps and buckles are too bulky to allow a user to simultaneously wear a headmount device and a helmet because the harness of the typical headmount equipment interferes with the helmet's suspension system.

This interference also causes localized pressure on the soft tissue of the user, causing pain either immediately, or over time. Such localized pain to soft tissue is commonly referred to as a "hotspot." Additionally, the interference of the harness with the helmet's suspension system also causes problems with attaining the proper adjustment of the helmet in conjunction with the headmount equipment. And even after the user properly adjusts the helmet, the interference of the harness with the helmet's suspension system interferes with maintaining the proper adjustment of both the helmet and the headmount equipment.

Another problem commonly associated with typical headmount equipment is that it fails to distribute the load of the vision enhancing system over the optimal portion of the cranium. For example, optimally distributing the load over the top of the skull, the forehead, the temporal region and the cheekbone would eliminate much of the pain and discomfort discussed above. Another problem commonly associated with typical headmount equipment is that it prevents the expansion of the cranium. Such expansion occurs with normal dilation of blood vessels and increased blood flow due to temperature regulation and/or physical exertion. Preventing the cranium from expanding will result in the user experiencing the pain and discomfort discussed above. Similarly, the typical headmount equipment will not contract along with the cranium when the blood vessels constrict. Therefore, as the cranium contracts the typical headmount loosens and allows the headmount equipment to move out of place.

Another problem with the typical headmount equipment is that it blocks a considerable portion of the user's facial area. For example, typical headmount equipment is bulky and extends into the user's peripheral vision, resulting in a reduction to the user's field of vision. Similarly, the poor design of typical headmount equipment also prevents the user from employing communication devices or breathing apparatus while simultaneously wearing the headmount equipment.

Problems also arise when the user employs incompatible protective eye wear in conjunction with typical headmount equipment. For example, common headmount equipment fails to provide enough space between it and the user's cranium so as to allow the arms of protective eyewear to wrap around the user's cranium. Therefore, the arms of the protective eyewear are forced on top of the headmount equipment. Positioning the eye wear in such a manner that prevents it from snuggly fitting against the user's cranium, thereby allowing the eyewear to fall off or move out of position.

Accordingly, these and other drawbacks exist.

SUMMARY OF THE INVENTION

According to the present invention, an apparatus is provided that overcomes these and other drawbacks in the existing headmount apparatus. According to one embodiment of the present invention the headmount apparatus for mounting vision enhancement equipment thereon should be comprised of a mounting shell having at least one pad and having at least one mounting surface to which the vision enhancing equipment is mounted, where the at least one pad is configured to contact the user's head, and at least one elastic strap is attached to the mounting shell for securing the mounting shell to the user's head.

According to another embodiment of the present invention, the headmount apparatus for mounting vision enhancement equipment thereon should be comprised of at least one mounting frame for attaching vision enhancement equipment, at least one hardware mounting surface for accepting the at least one mounting frame; and a hood configured to fit over a user's head and being made at least in part from an elastic material and comprising the at least one hardware mounting surface.

Additional objects and advantages of the present invention will be set forth in part in the description which follows, and in part will be obvious from the description, or may be learned by practice of the invention. The objects and advantages of the invention will be realized and attained by means of instrumentalities and combinations, particularly pointed out in the appended claims.

BRIEF DESCRIPTION OF THE DRAWINGS

Various embodiments of headmount apparatus will be presented, and their handling and special features explained in the following description and with reference to the drawings in which:

FIG. 4B depicts the rear view of the connected occipital assembly in the full headmount.

FIG. 4C depicts the rear view of the connected occipital assembly being tightened in the full headmount.

DETAILED DESCRIPTION OF THE DRAWINGS AND PREFERRED EMBODIMENTS

Figure 1:
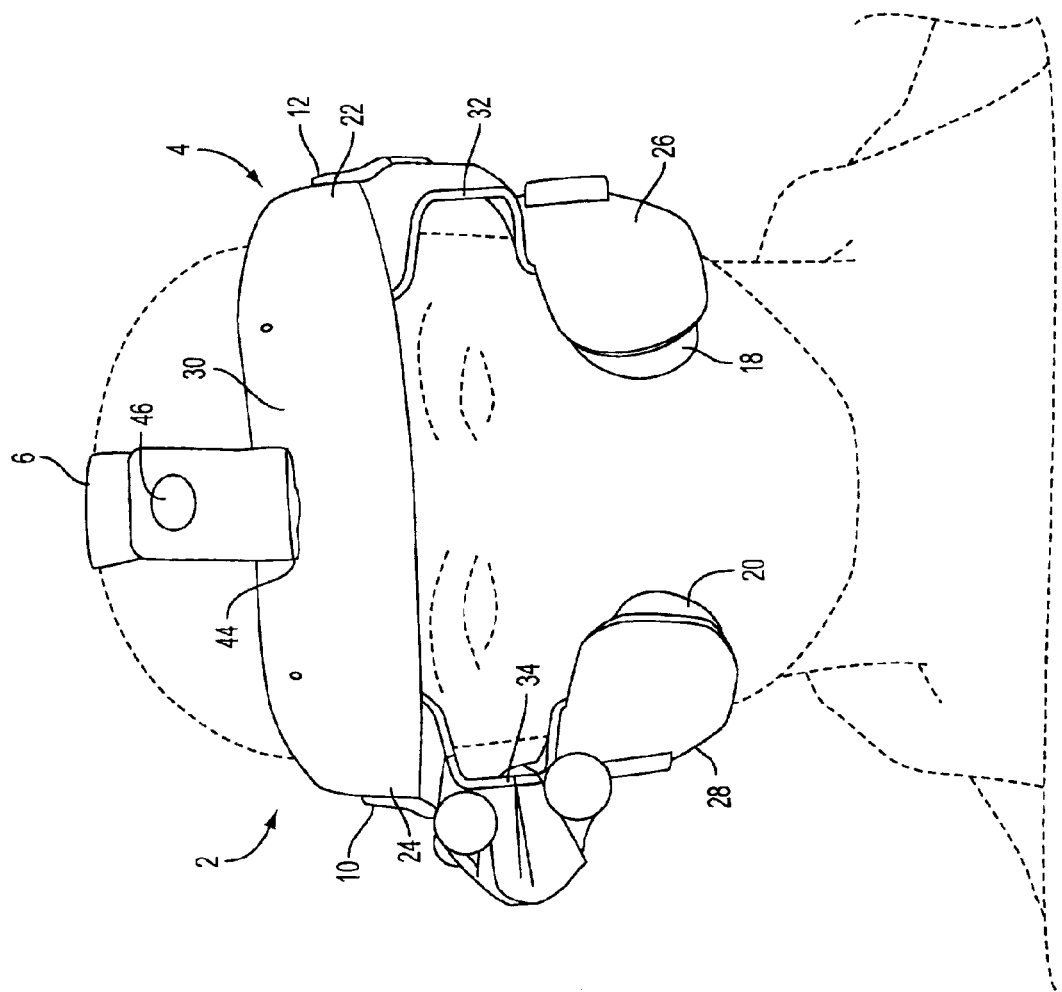
FIG. 1 depicts a front view of a full headmount.
Figure 2:
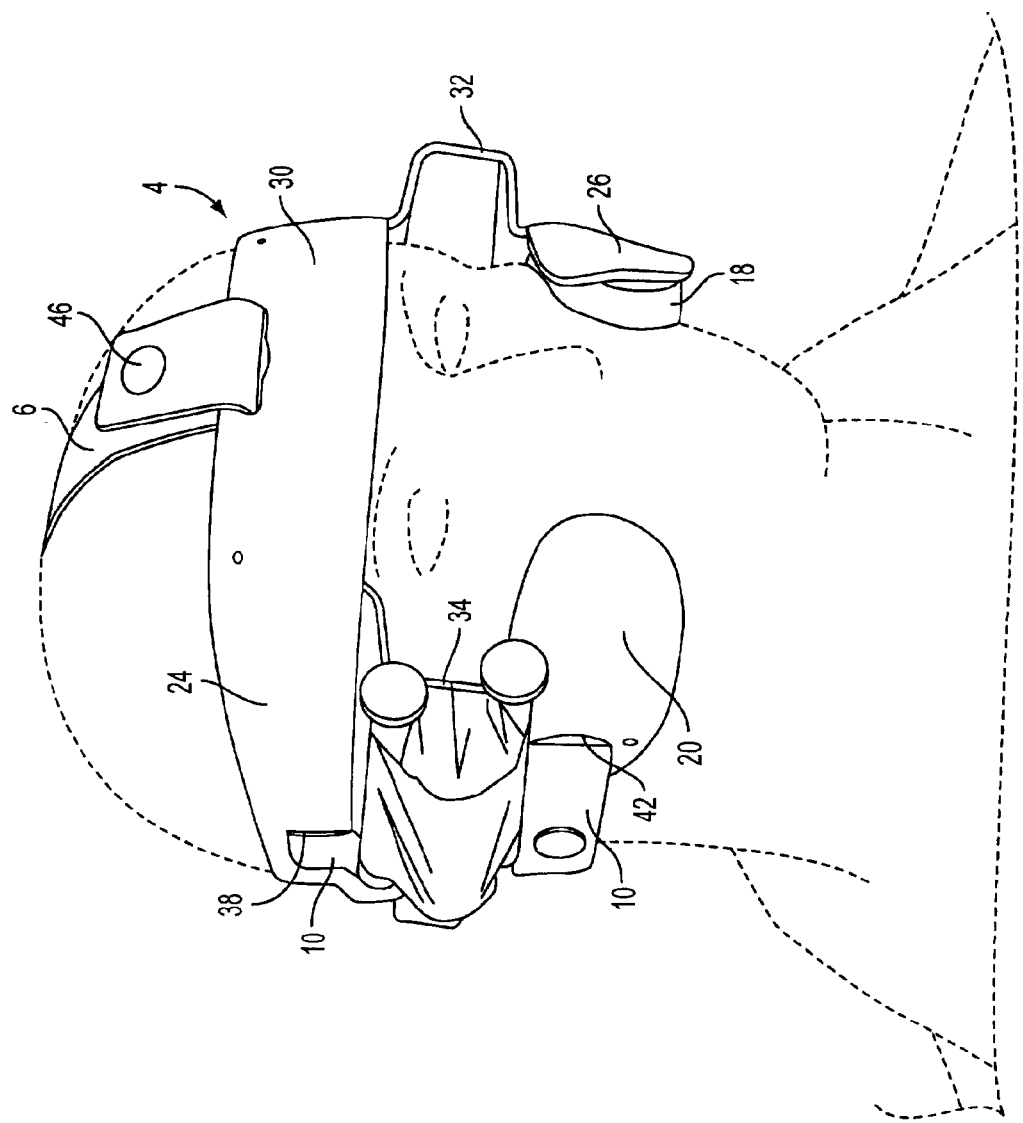
FIG. 2 depicts an angled frontal view of a full headmount.
Figure 3:
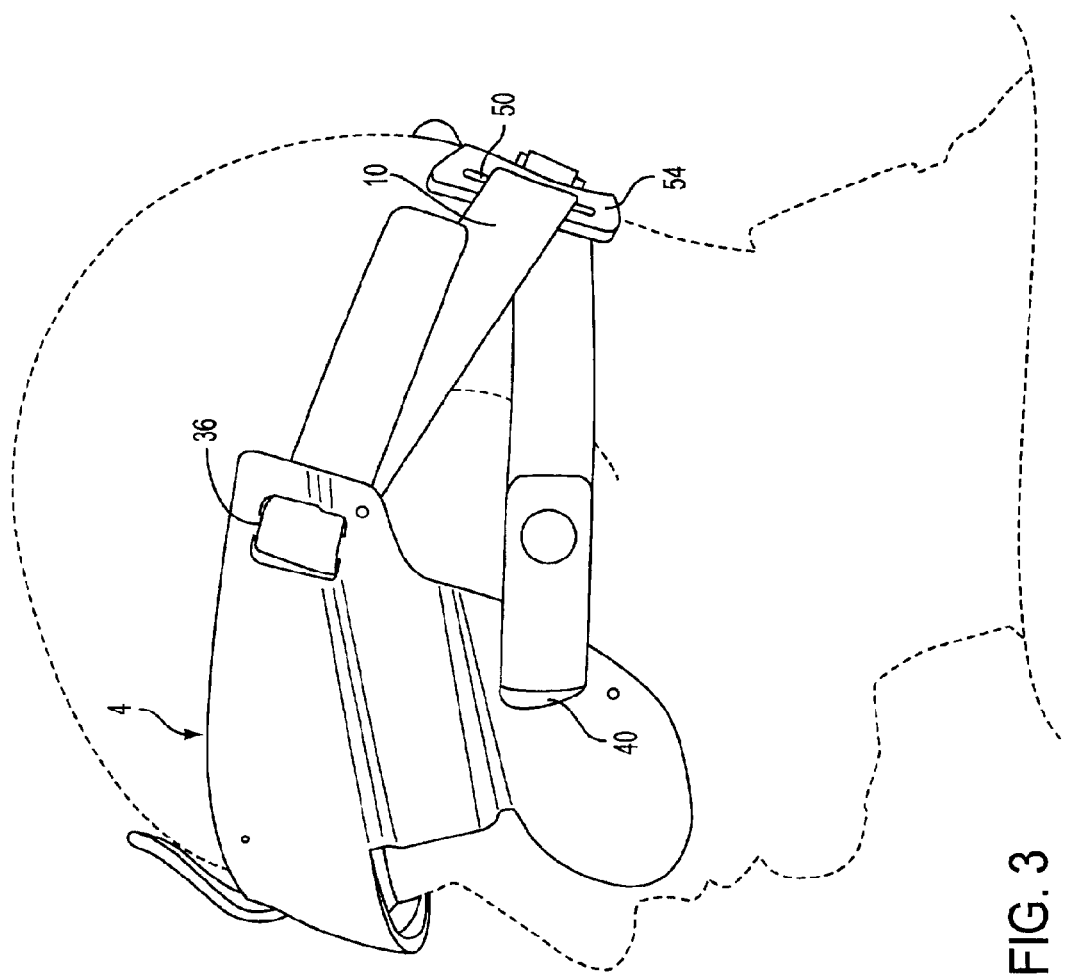
FIG. 3 depicts a side view of a full headmount.

FIGS. 1–6 show varying views of the full headmount embodiment 2 of the inventive device, which is comprised of a full mounting shell or full face mask 4, a top strap 6, an occipital assembly 8, a right strap 10, a left strap 12, and pressure pads 14, 15, 16, 18 and 20. FIG. 1 shows a frontal view of the face mask 4 consisting of the left and right temporal hardware mounting surface 22 and 24, the left and right cheek hardware mounting surface 26 and 28, the forehead hardware mounting surface 30, the left and right eyewear bridge 32 and 34 which can also accommodate the mounting of hardware, a left and right temporal single-eyelet 36 and 38, a left and right cheek double-eyelet 40 and 42 and a frontal eyelet 44.

The full face mask 4 consists of a semi-flexible plastic shell made of a thermoplastic elastomer or the like. The full face mask 4 begins in the user's temporal region, extends across the frontal portion of the cranium ending in the opposite temporal region, while also extending down into both cheek regions of the cranium. Because the full face mask 4 is molded to wrap around the frontal portion of the user's cranium, it minimizes or even eliminates contact with the sphenoid region of the user's cranium. Although the full face mask 4 may be manufactured in varying sizes so as to accommodate all classes of craniums, using a semi-flexible plastic shell minimizes the number of sizes of headmounts that need to be manufactured because the semi-flexible plastic shell is anthropometric in that it allows the full face mask 4 to flex open, or open up, so as to fit a greater number of different sized craniums.

Even though the full face mask 4 is anthropometrically adjustable, it also provides enough rigidity at local regions to mount and hold the various head-mounted vision enhancement and communication hardware employed by the various user groups discussed below. For example, vision assist devices can be mounted at the left and right temporal hardware mounting surface 22 and 24, at the left and right cheek hardware mounting surface 26 and 28, at the left and right eyewear bridge 32 and 34, and/or at the forehead hardware mounting surface 30. Importantly, the thermoplastic elastomer is rigid enough to support the vision enhancing equipment without requiring that it be cantilevered about the users face. Additionally this rigidity not only prevents the vision enhancing equipment from shifting before the user's eyes, but it eliminates the typical deformity to the shell that is caused by the weight of the vision enhancing equipment.

The face mask 4 is held in position on the user's cranium by the top strap 6, the right strap 10 and the left strap 12, which are fabricated of an inelastic but breathable material, such as cotton, polypropylene, nylon or any such non-stretching webbing. All of the straps 6, 10 and 12 can be attached to the face mask 4 by any method known in the art. In one embodiment the top strap 6 sits atop the user's head, beginning at the frontal eyelet 44. After passing one end of the top strap 6 through the frontal eyelet 44, it is looped onto itself and riveted with the top strap rivet 46. The other end of the top strap 6 is then passed through the top occipital double-eyelet 48 on the occipital buckle plate 8. Employing double-eyelets allows a given strap to have a point of adjustment The left strap 12 begins in the left temporal eyelet 36, passes through the occipital insert eyelet 50, and then passes through the left cheek double-eyelet 40. Ending the left strap 12 in the left cheek double-eyelet 40 provides the left strap 12 with a point of adjustment. The left strap 12 is secured to the full face mask 4 by either looping the left strap 12 through the left temporal eyelet 36 and then attaching it to itself by either a rivet, a snap, a button or any similar type of attachment such as stitching, or the left temporal eyelet 36 can be eliminated and the left strap can be attached directly to the face mask 4 by any attachment means known in the art, such as being directly molded into the full face mask 4, or being riveted directly onto the full face mask 4.

Similarly, the right strap 10 begins in the right temporal eyelet 38, passes through the occipital buckle plate eyelet 52, and then passes through the right cheek double-eyelet 42. Ending the right strap 10 in the right cheek double-eyelet 42 provides the right strap 10 with a point of adjustment. The right strap 10 is secured to the full face mask 4 by either looping the right strap 10 through the right temporal eyelet 38 and then attaching it to itself by either a rivet, a snap, a button or any similar type of attachment such as stitching, or the right temporal eyelet 38 can be eliminated and the right strap 10 can be attached directly to the face mask 4 by any attachment means known in the art, such as being directly molded into the face mask 4, or being riveted directly onto the full face mask 4. The beginning and end points of all the straps can be interchanged, along with the interchanging of the respective single and double eyelets.

The occipital assembly 8 is positioned either over or below the occipital protuberance, and is comprised of the occipital insert 54 and the occipital buckle plate 56. The occipital insert 54 contains the occipital insert eyelet 50 and an adjustment tongue 58. The adjustment tongue 58 contains angled ridges that allow it to be inserted into the occipital buckle 60, but which prevent it from unintentionally withdrawing from the occipital buckle 60. The occipital buckle plate 56 contains the occipital buckle plate eyelet 52, the top occipital double-eyelet 48, and the occipital buckle 60. The occipital buckle 60 can be attached to the occipital buckle plate 56 by any means known in the art, including bolting, gluing, or molding the occipital buckle plate 56 with the occipital buckle 60 already in place.

Figure 4A:
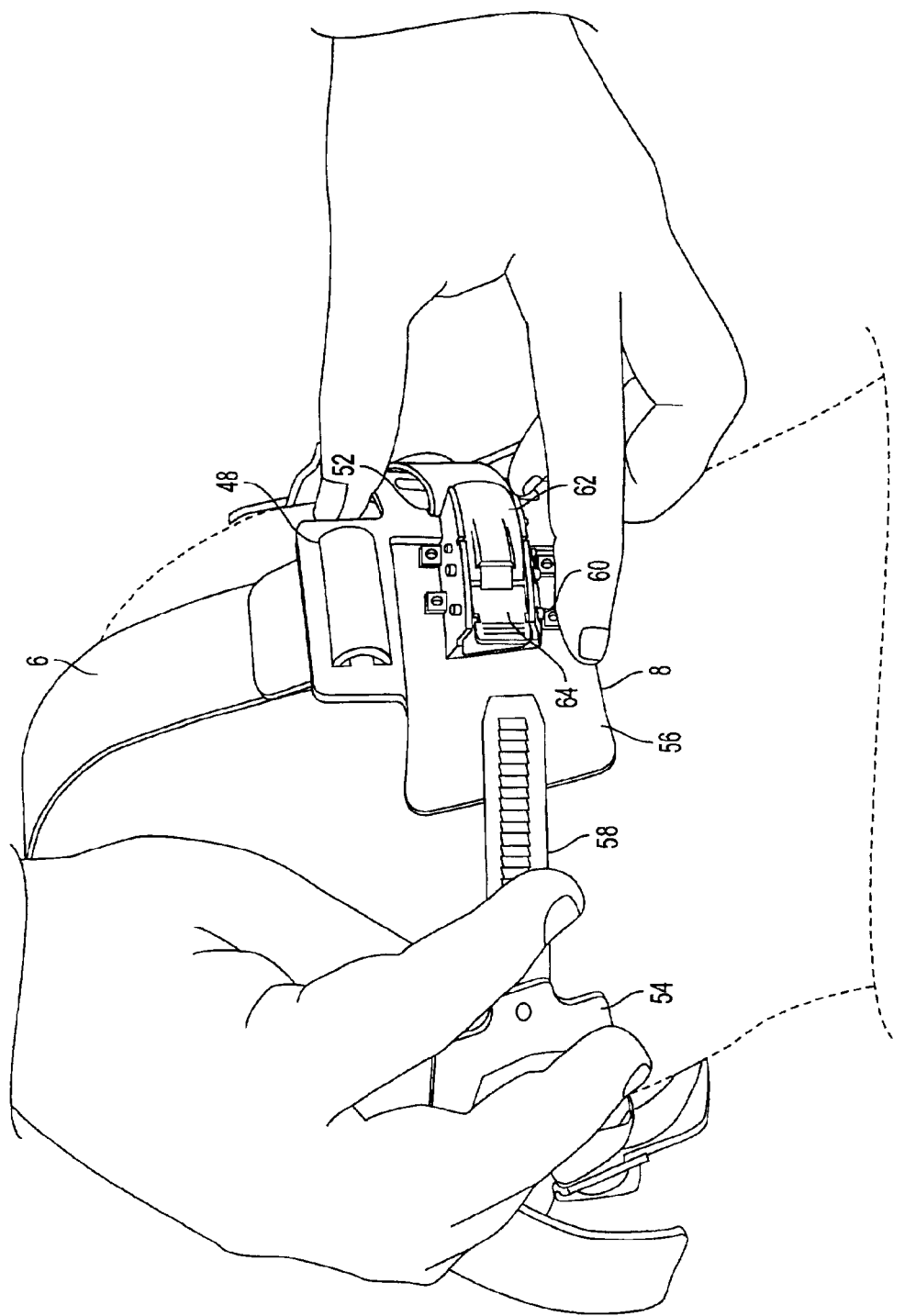
FIG. 4A a depicts the rear view of the two parts of the occipital assembly in the full headmount.
Figure 5:
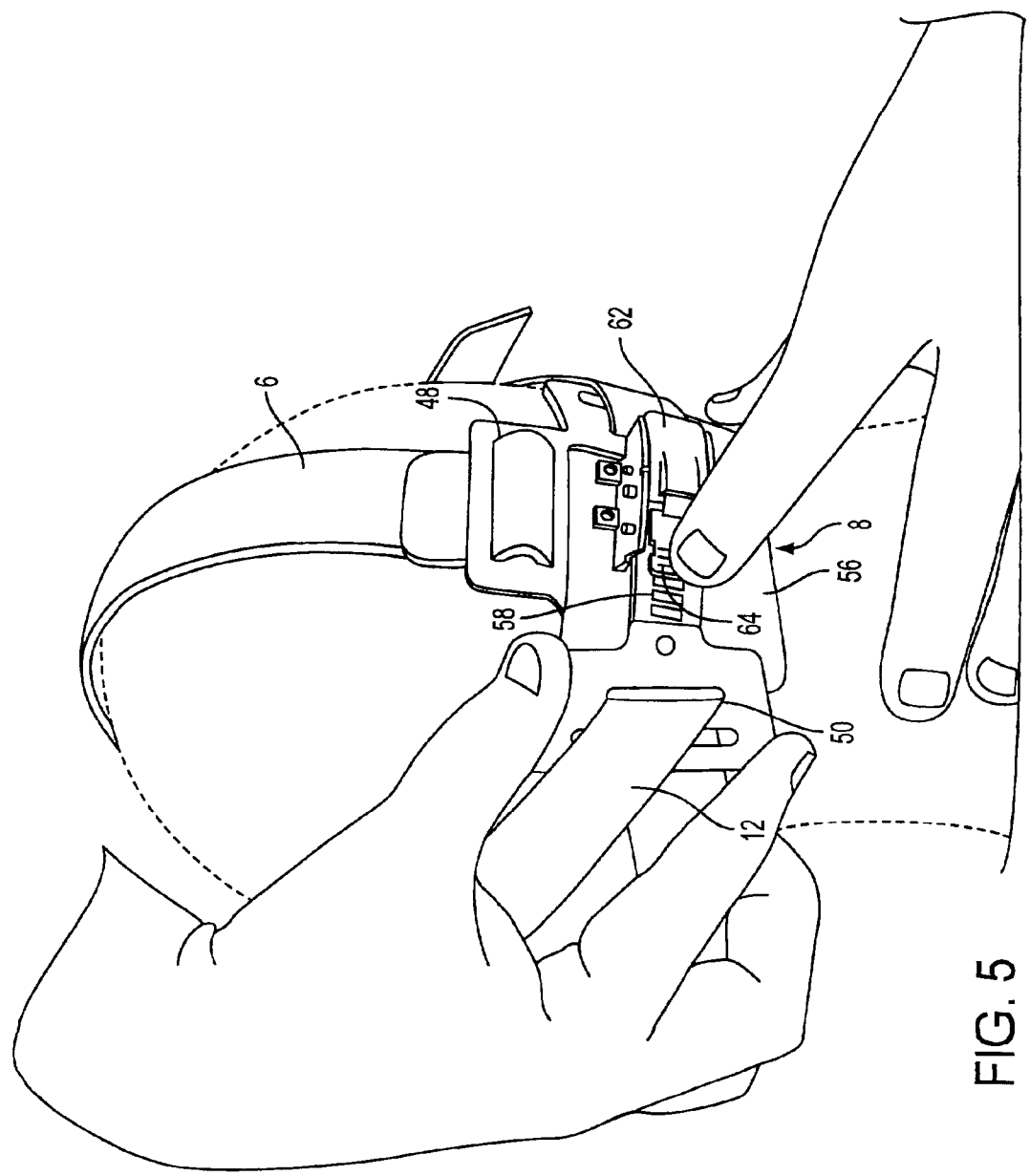
FIG. 5 depicts the release of the occipital assembly in the full headmount.

After the user places the full headmount 2 on his head he can adjust the top strap 6, the right strap 10 and the left strap 12 for a snug fit by pulling on the loose ends of each strap that emerge from the top occipital double-eyelet 48, the right cheek double-eyelet 38 and the left cheek double-eyelet 36, respectively. For an even snugger fit the adjustment tongue 58 can be inserted into the occipital buckle 60, as shown in FIGS. 4A through 4B. Once inserted, the full headmount 2 is fit snugly to the user's head, thereby allowing the user to wear the full headmount 2 during light maneuvers without it moving around on his head.

If the user wishes to attain a tighter fit so that the full headmount 2 does not move around during rigorous maneuvers, as shown in FIG. 4C the user can lift up on the adjustment lever 62 as needed, thereby advancing the adjustment tongue 58 further into the occipital buckle 60. With each advancement of the adjustment tongue 58 into the occipital buckle 60, each of the straps will tighten. For example, as the adjustment tongue 58 moves into the occipital buckle 60, thereby tightening the right strap 10 and the left strap 12, those two straps will cause the occipital assembly 8 to move further below the occipital protuberance. This results in the tightening of the top strap 6.

Once the user has inserted the occipital insert 54 into the occipital buckle plate 56 and tightened the straps either snuggly or tightly, he can gain immediate release from the full headmount 2 by depressing the release tab 64. Depressing the release tab releases the pressure on the raised tabs of the adjustment tongue 58, thereby allowing the adjustment tongue 58 to exit the occipital buckle 60, which in turn results in a lessening of the tension exerted by the various straps on the user's cranium. While the straps in the embodiment containing the occipital assembly are preferably composed of inelastic material, the straps can also be fabricated of stretchable or breathable material, such as lycra or neoprene, as discussed herein.

The full head embodiment of the face mask 4 mounts on and is supported by the user's cranium at the points where the full face mask 4 contacts and rests upon the user's cranium. Specifically, the full head embodiment of the full face mask 4 contacts the user's cranium at the left and right temporal hardware mounting surfaces 22 and 24, at the left and right cheekbone mounting surfaces 26 and 28, and at the forehead hardware mounting surface 30. These mounting surfaces 22, 24, 26, 28 and 30 or contact points support the full face mask 4, thereby allowing vision enhancement equipment and communication devices to be mounted to it. Additionally, these contact points on the mounting surfaces support the mounted vision enhancing equipment so as to prevent the mounting shell or face mask 4 from deforming from the weight of the vision enhancing equipment. Because these contact points are less sensitive to pressure, they aid in eliminating the "hot spots" which commonly occur from use of headmounts.

Figure 6:
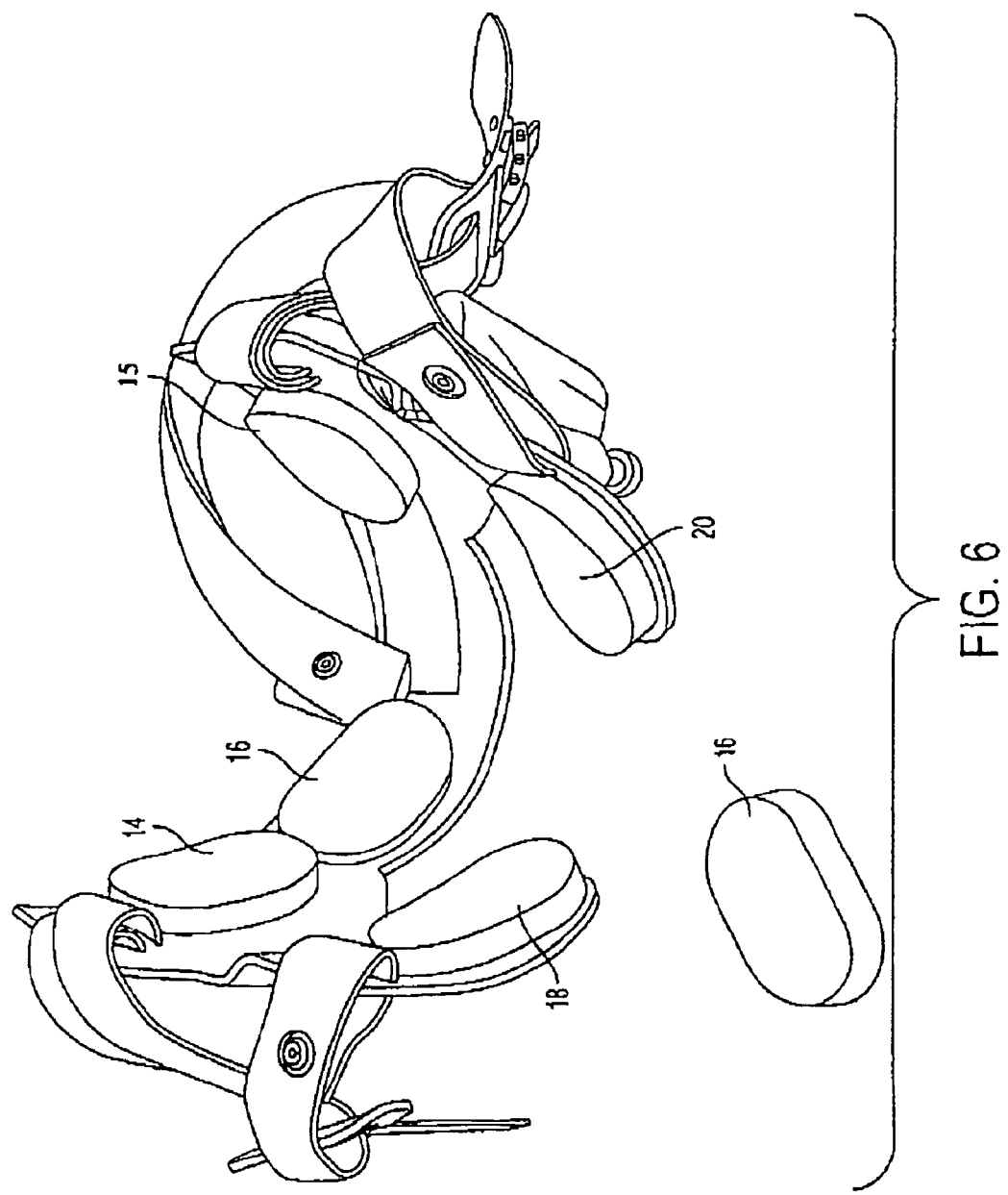
FIG. 6 depicts the rear view of the interior of the full headmount.

As shown particularly in FIG. 6, the backside of each of the mounting surfaces 22, 24, 26, 28 and 30 has a corresponding pressure pad. For example, under the left and right temporal hardware mourning surfaces 22 and 24, there is corresponding left temporal pressure pad 14 and right temporal pressure pad 15; under the forehead hardware mounting surface 30 there is a corresponding forehead pressure pad 16; and under the left and right cheek hardware mounting surfaces 26 and 28 there is a corresponding left cheek pressure pad 18 and a right check pressure pad 20. These pressure pads 14–20 are attached to the inside of the full face mask 4 by any means known in the art, such as book sand loop fasteners, glue, snaps, bonding, VELCRO (hook and loop fasteners), etc.

These pressure pads 14–20 are manufactured in differing thicknesses and differing compression strengths so as to allow the user to optimize the comfort and fit of the full face mask 4 to their distinct anthropometric features. In addition to thereby being form compliant to the user's skin and underlying skull, the differing thicknesses and compression strengths act as a load distributing interface between the full face mask 4 and its mounting surfaces, and the user. The inelastic straps 6, 10 and 12 provide a positive link between the occipital assembly 8 and these pads. Additionally, because the pressure pads 14–20 are removable, the user can adjust their position so as to minimize the pressure asserted on a given area. The pressure pads 14–20 are coated with a moisture wicking covering well known in the art, as well as with a rot inhibitor which inhibits mold and/or fungus from growing on the pads.

Figure 7A:
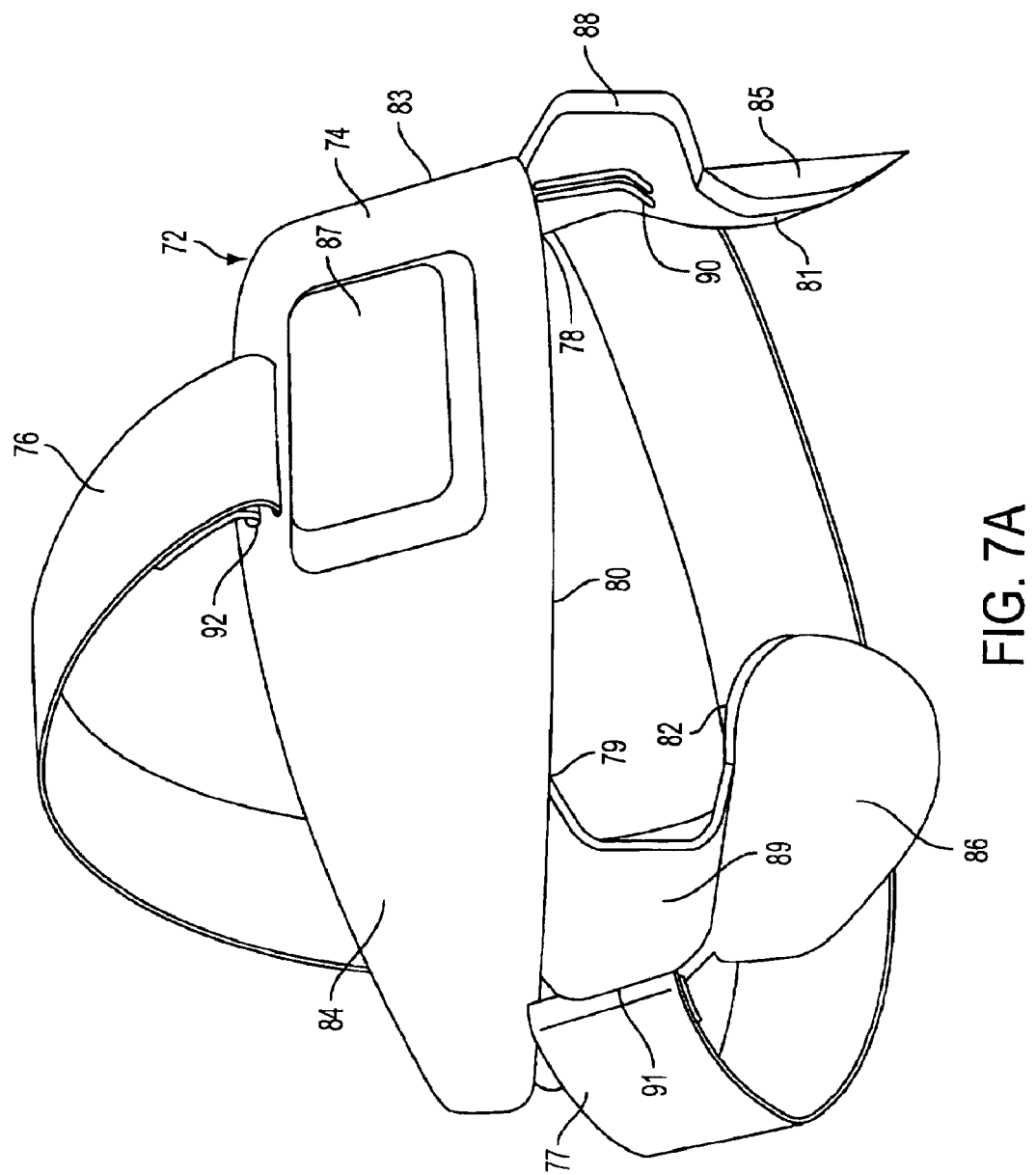
FIG. 7A depicts an angled frontal view of the full head embodiment with elastic straps.
Figure 7B:
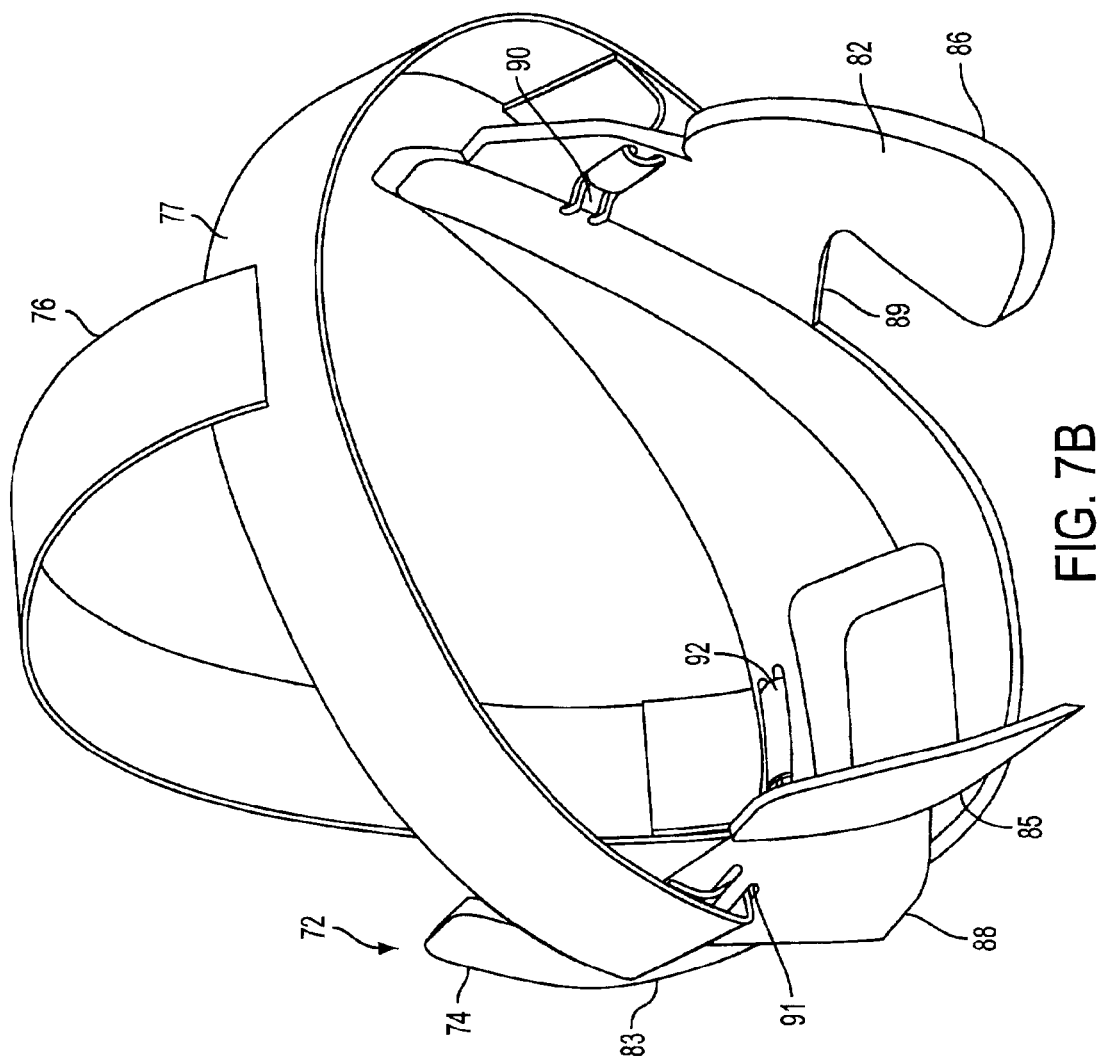
FIG. 7B depicts an angled rear view of the full head embodiment with elastic straps.

An alternative full headmount embodiment 72 is shown in FIGS. 7A and 7B, in which the full face mask 74 is similar to the full face mask 4 described above, except that the straps differ and the occipital assembly is eliminated. Specifically, the full headmount 72 embodiment is comprised of a full mounting shell or full face mask 74, a top strap 76, a side strap 77, and pressure pads including a left temporal pressure pad 78, a right temporal pressure pad 79, a forehead pressure pad 80, a left cheek pressure pad 81 and a right cheek pressure pad 82. The full face mask 74 consists of the left and right temporal hardware mounting surface 83 and 84, the left and right cheek hardware mounting surface 85 and 86, the forehead hardware mounting surface 87, the left and right eyewear bridge 88 and 89 which also allows for the mounting of hardware, a left and right temporal double-eyelet 90 and 91, and a frontal double-eyelet 92.

Figure 7C:
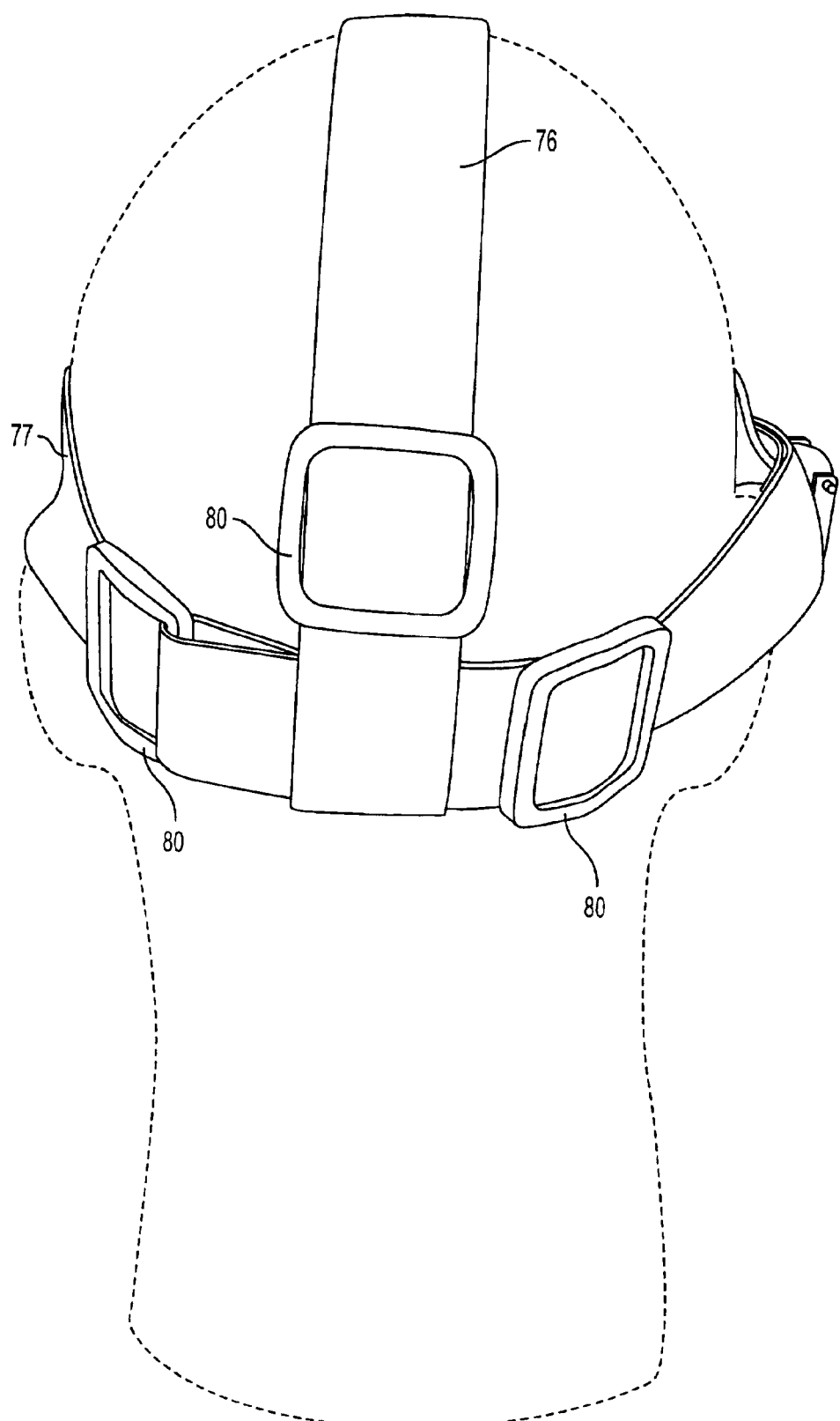
FIG. 7C depicts a rear view of the full head embodiment with adjustment buckles.

The full face mask 74 in FIG. 7A and FIG. 7B is similar to the full face mask 4 described above in terms of materials, construction, points of contact, rigidity, padding, etc., except that it only has three points of attachment for the straps. For purposes of illustration, the side strap 77 begins by being looped through the left temporal double-eyelet 90, is wrapped around the user's head, and ends in the in right temporal double-eyelet 91. Although the double-eyelets 90 and 91 offer both ends of the side strap 77 a point of adjustment, the side strap 77 could also be cut to fit a certain class or size of craniums and then be permanently fixed to the full face mask 74 by any method discussed above. The top strap 76 is the second strap, and it begins in the frontal double-eyelet 92 and ends by being attached to the side strap 77 in any number of ways. For example, the top strap could be stitched to the side strap 77, or the top strap 76 could be looped around the side strap 77, and then stitched back onto itself so that the side strap 77 and top strap 76 move independent of each other as shown in FIG. 7C. The tightness of the top strap 76 and the side strap 77 can also be adjusted by employing the strap in conjunction with the doublet buckle 80 shown in FIG. 7C and FIG. 7D. This doublet buckle 80, which should be as thin as possible to minimize interference with other headgear, can also be employed with the full head embodiment 2 discussed herein. Although the frontal double-eyelet 92 also provides the top strap 76 with a point of adjustment as discussed above, the top strap 76 could also be directly attached to the full face mask 74 by any method discussed above.

Another difference between the above described full headmount 2 as depicted in FIGS. 1–6, and the full headmount 74 in FIGS. 7A–7D is that the top strap 76 and the side strap 77 are made of stretchable, breathable material, such as lycra or a perforated neoprene. Using such stretchable material has several advantages, including increasing the number of head sizes that can use a given class of full headmounts 2. It also provides a snugger fit to the user's head without resorting to adjusting the straps 76 and 77 in the respective double-eyelets 90, 91 and 92. In fact, the very nature of the lycra or perforated neoprene material could even allow for the elimination of the left and right temporal double-eyelets 90 and 91, and elimination of the frontal double-eyelet 92 because once the straps were permanently attached to the full face mask 74, the straps 76 and 77 would simply stretch to a snug fit on the user's head. Such a snug fit is enhanced by the fact that the full face mask is anthropometric, thereby allowing it to flex open and fit snugly on the user's cranium. While the straps in an embodiment lacking an occipital assembly are preferably composed of an elastic material, the straps can also be fabricated of the non-elastic material such as cotton, as discussed herein.

If the double-eyelets are employed, the user can adjust the fit of the full headmount 72 after placing it on his head by pulling on the loose ends of each strap that emerge from the frontal double-eyelet 92, the left temporal double-eyelet 90 and the right temporal double-eyelet 91. Once adjusted, the full headmount 72 embodiment is ready to allow the user to wear the full headmount 72 during light maneuvers without it moving around on his head. Additionally, the user can employ the full headmount 72 to mount lightweight vision enhancement devices, such as night vision cameras or microscopic lenses, which are used in situations where the user is not performing vigorous maneuvers, such as a surgeon performing microscopic surgery, or a computer user viewing a miniaturized display. The top strap 76 and side strap 77 can also be adjusted by manipulating those straps within the doublet buckle 80 as discussed herein.

By eliminating the occipital assembly from the full headmount 72 embodiment, and employing only thin flexible straps made of lycra or perforated neoprene, and/or employing thin doublet buckles, the interference between the full headmount 72 and other protective head gear worn by the user, such as a helmet and its associated conventional harness, is further reduced, minimized or even eliminated.

Figure 7D:
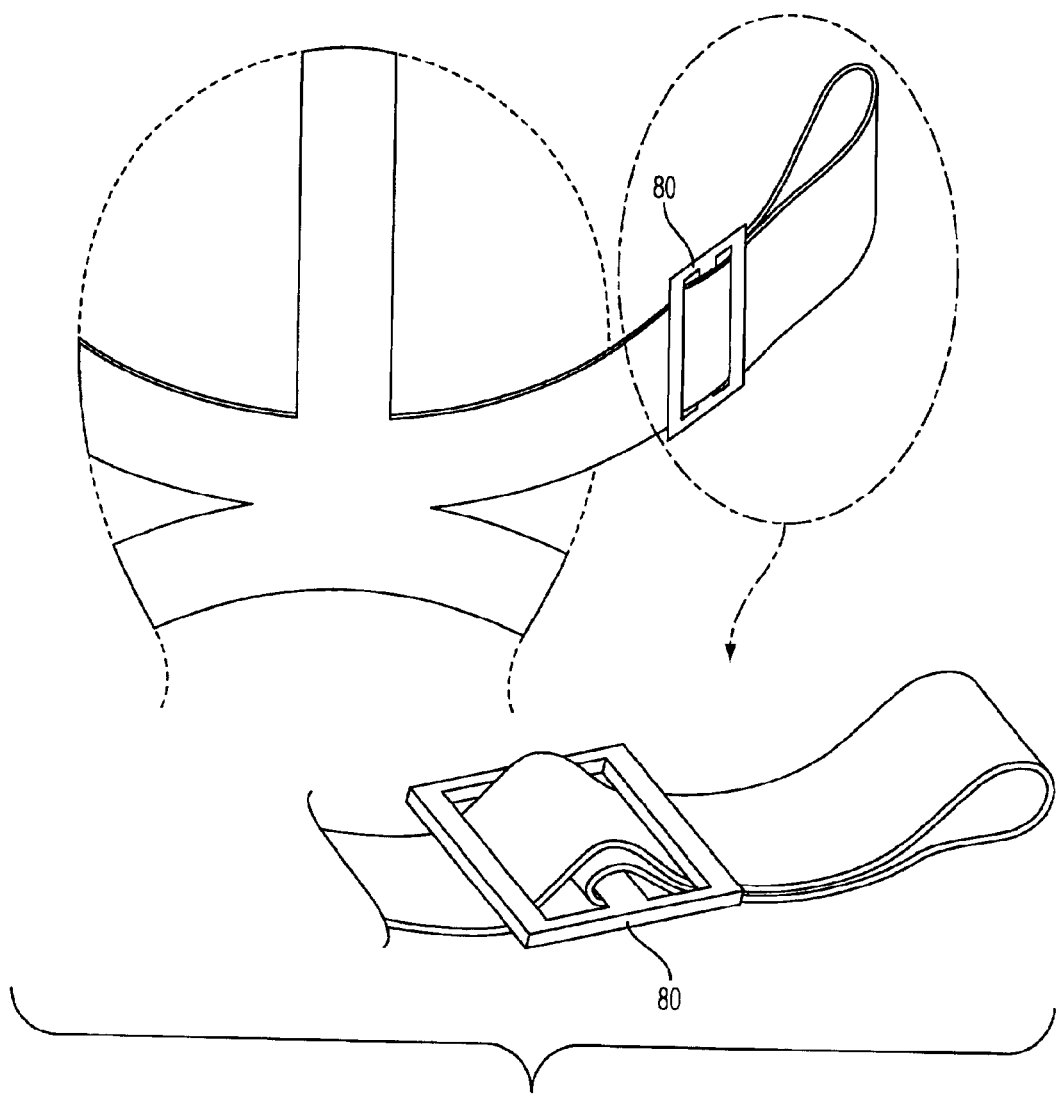
FIG. 7D depicts a rear view of a five strap full head embodiment with adjustment buckle.

Alternately, the full face mask can be held in position by employing any number of separate straps. FIG. 7D discloses a five strap embodiment where one strap begins in the left cheekbone region, another begins in the left temporal area, the third begins in the forehead region, the fourth begins in the right temporal region and the fifth begins in the right cheekbone region. These five straps are attached to the full face mask by any means described herein, and can employ the doublet buckles discussed herein to allow a means of adjustment in addition to the double-eyelets. All five straps are joined together in the occipital region by any means known in the art, such as sewing the ends together at the occipital lobe, riveting the ends together, etc. Similar strap arrangements can be constructed out of three, two one strap.

Figure 8:
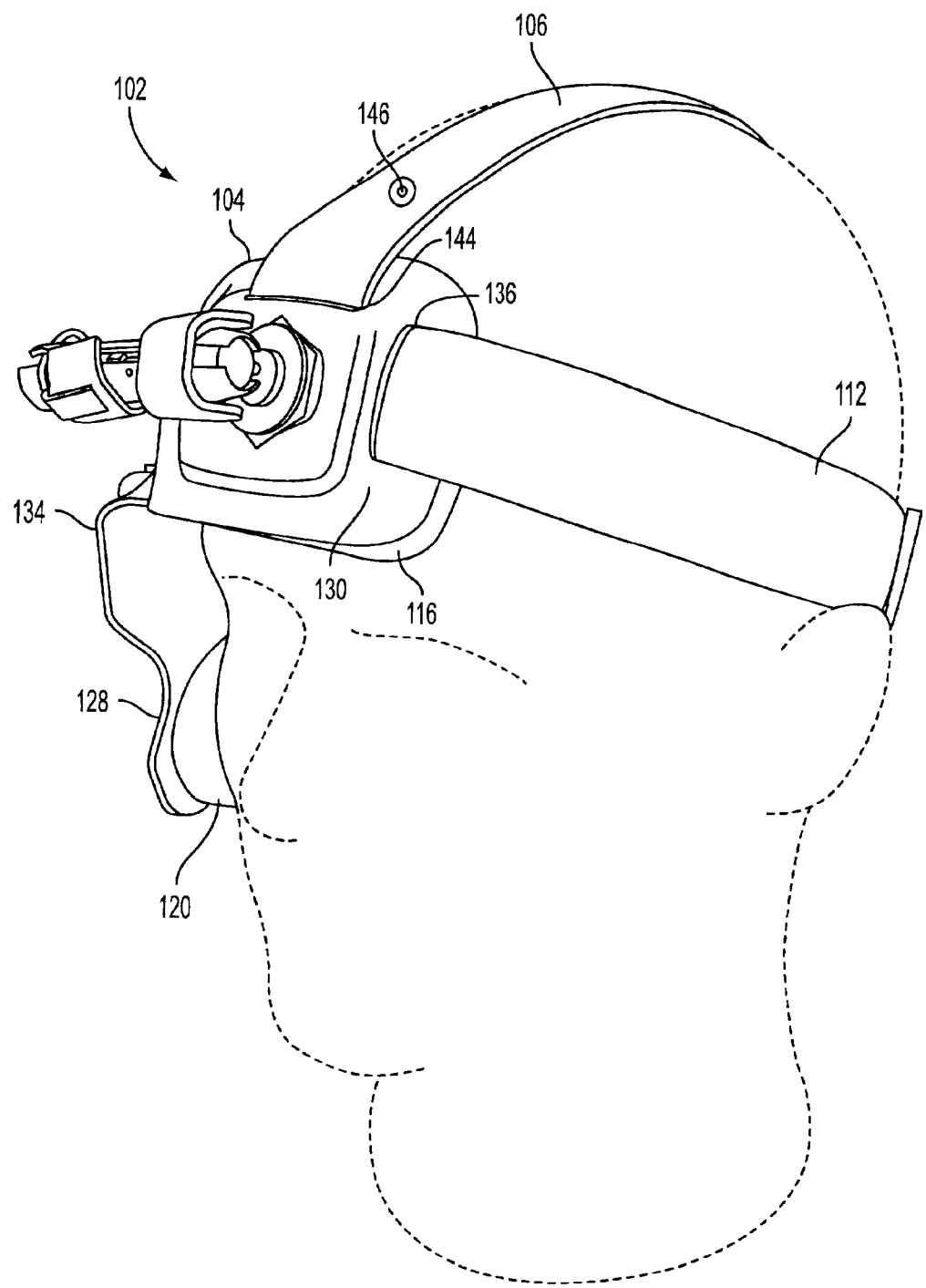
FIG. 8 depicts an angled side view of the half headmount.
Figure 9:
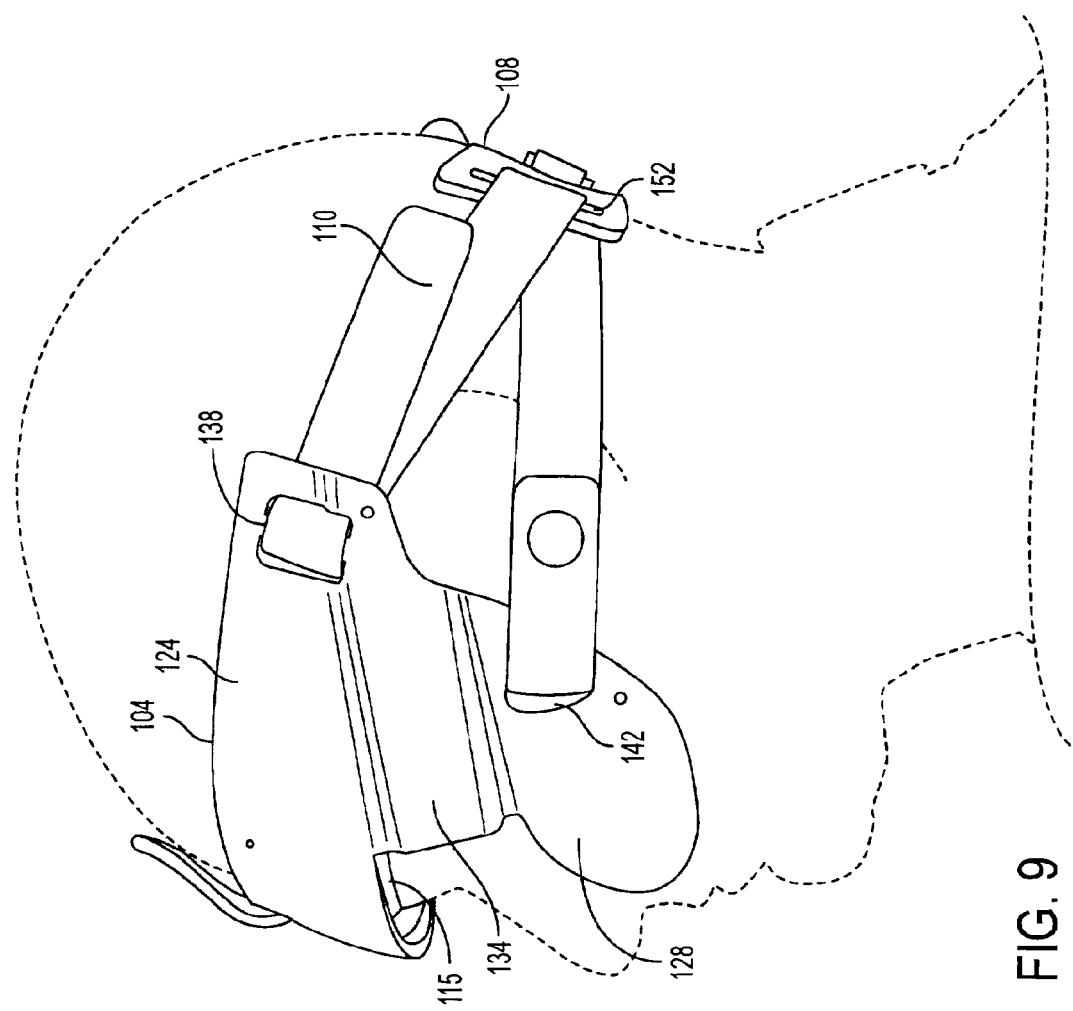
FIG. 9 depicts a side view of the half headmount.
Figure 10:
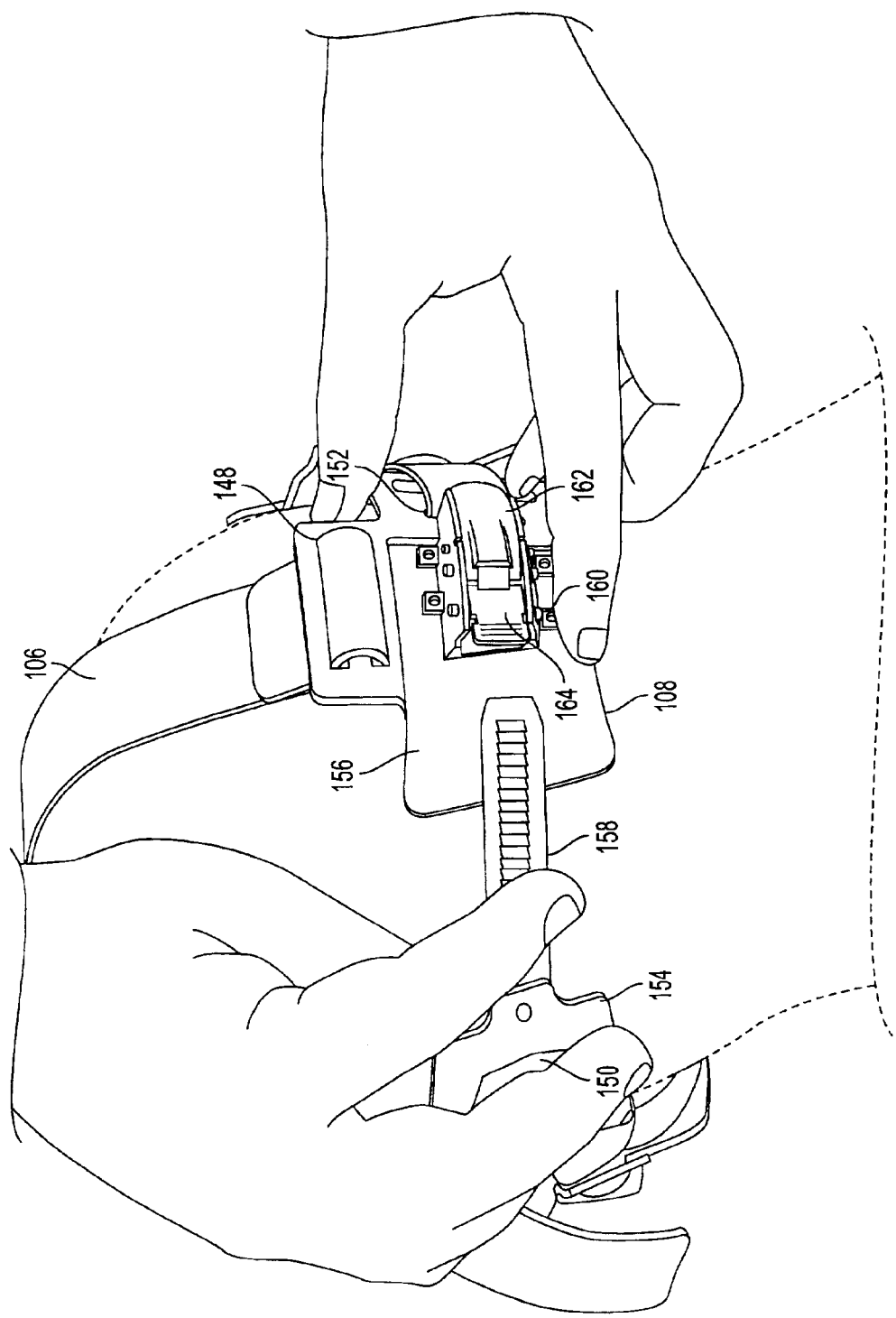
FIG. 10 depicts the rear view of the two parts of the occipital assembly in the half headmount

An alternative embodiment to the full headmount 2 is the half headmount 102 depicted in FIGS. 8–10. The half headmount 102 is comprised of the half face mask 104, the top strap 106, the first side strap 110, the second side strap 112, the occipital assembly 108, the temporal pressure pad 115, the forehead pressure pad 116 and the cheek pressure pad 120. FIGS. 8–10 show varying views of the half face mask 104 which further consists of the temporal hardware mounting surface 124, the cheek hardware mounting surface 128, the forehead hardware mounting surface 130, the eyewear bridge 134 which can also accommodate mounted hardware, a forehead eyelet 136, a temporal eyelet 138, a cheek double-eyelet 142 and a frontal eyelet 144. Note that all the single eyelets discussed herein are interchangeable with double eyelets. Like the embodiment discussed above, the half face mask 104 consists of a semi-flexible plastic shell made of a thermoplastic elastomer or the like, which allows for entry of varying sized craniums, while also allowing for the half face mask 104 to conform to the user's head.

The half face mask 104 begins in one of the user's temporal regions, and extends to but then ends about midway through the user's forehead or frontal portion of the cranium. Because the half face mask 104 is molded to only wrap around the user's cranium from one temporal region to the frontal/forehead portion of the cranium, it not only minimizes or even eliminates contact with the sphenoid region of the user's cranium, but it also eliminates contact with the opposing temporal region. Although the half face mask 104 may be manufactured in varying sizes so as to accommodate all classes of craniums, using a semi-flexible plastic shell minimizes the number of sizes of headmounts that need to be manufactured because the semi-flexible plastic shell is anthropometric in that it allows the full face mask 104 to flex open, or open up, so as to fit a greater number of different sized craniums. Like the full face mask 4, the half face mask 104 also provides enough rigidity at local regions to mount and hold the various head-mounted vision enhancement and communication hardware employed by the various user groups discussed herein.

For example, vision assist devices can be mounted at the temporal hardware mounting surface 124, at the cheek hardware mounting surface 128, at the eyewear bridge 134, and/or at the forehead hardware mounting surface 130. Importantly, the thermoplastic elastomer is rigid enough to support the vision enhancing equipment without requiring that it be cantilevered about the users face. Additionally this rigidity also prevents the vision enhancing equipment from shifting before the user's eyes.

The straps 106, 110 and 112 are fabricated of an inelastic but breathable material, such as cotton, polypropylene, nylon or any such nonstretching webbing. All of the straps 106, 110 and 112 can be attached to the half face mask 104 by any method known in the art. In one embodiment the top strap 106 sits atop the user's head, beginning at the frontal eyelet 44. After passing one end of the top strap 106 through the frontal eyelet 144, it is looped onto itself and riveted with the top strap rivet 146. The other end of the top strap 106 is then passed through the top occipital double-eyelet 148 on the occipital buckle plate 156. Employing double-eyelets allows a given strap to have a point of adjustment. Although the positioning and attachment of the second side strap 112 and the first side strap 110 as described herein can be interchanged, for purposes of illustration the second side strap 112, as shown in FIG. 8, begins in the forehead eyelet 136 in the half face mask 104. The second side strap 112 can be attached to the forehead eyelet 136 in the half face mask 104 by any method known in the art, such as passing one end of the second side strap 112 through the forehead eyelet 136, and then passing the other end through the occipital insert double-eyelet 150 as shown in FIG. 10. Passing the second side strap 112 through the occipital insert double-eyelet 150 offers the second side strap 112 a point of adjustment. The second side snap 112 can be secured to the forehead eyelet 136 or to the half face mask 104 by any means described herein.

As shown in FIG. 9, the first strap 110 begins in the temporal eyelet 138, passes through the occipital buckle plate eyelet 152, and then passes through the cheek double-eyelet 142. Ending the first strap 110 in the cheek double-eyelet 142 provides the first strap 110 with a point of adjustment. The first strap 110 is secured to the half face mask 104 by either looping the first strap 110 through the temporal eyelet 138 and then attaching it to itself by either a rivet, a snap, a button or any similar type of attachment such as stitching, or the temporal eyelet 138 can be eliminated and the first strap 110 can be attached directly to the half face mask 104 by any attachment means known in the art, such as being directly molded into the half face mask 104, or being riveted directly onto the half face mask 104. Moreover, the positioning of the single and double eyelets discussed herein, can be reversed.

As shown in FIG. 10, the occipital assembly 108 is positioned either over or below the occipital protuberance, and is comprised of the occipital insert 154 and the occipital buckle plate 156. The occipital insert 154 contains the occipital insert double-eyelet 150 and an adjustment tongue 158. The adjustment tongue 158 contains angled ridges that allow it to be inserted into the occipital buckle 160, but which prevent it from unintentionally withdrawing from the occipital buckle 160. The occipital buckle plate 156 contains the occipital buckle plate eyelet 152, the top occipital double-eyelet 148, and the occipital buckle 160. The occipital buckle 160 can be attached to the occipital buckle plate 156 by any means known in the art, including bolting, gluing, or molding the occipital buckle plate 156 with the occipital buckle 160 already in place.

The half headmount 102 is made snug on the user's head as well as tightened on the user's head as discussed herein. Specifically, after the user places the half headmount 102 on their head they can adjust the top strap 106, first side strap 110 and the second side strap 112 for a snug fit by pulling on the loose ends of each strap that emerge from the top occipital double-eyelet 148, the occipital insert double-eyelet 150 and the cheek double-eyelet 142, respectively. For an even snugger fit the adjustment tongue 158 can be inserted into the occipital buckle 160, as shown in FIG. 10. Once inserted, the half headmount 102 is fit snugly to the user's head, thereby allowing the user to wear the half headmount 102 during light maneuvers without it moving around on their head.

If the user wishes to attain a tighter fit so that the half headmount 102 does not move around during rigorous maneuvers, the user can lift up on the adjustment lever 162 as needed, thereby advancing the adjustment tongue 158 further into the occipital buckle 160, as disclosed herein. With each advancement of the adjustment tongue 158 into the occipital buckle 160, both the first side strap 112 and the second side strap 110 will tighten, thereby causing the occipital assembly 108 to move further below the occipital protuberance. This results in a tightening of the top strap 106.

Once the user has inserted the occipital insert 154 into the occipital buckle plate 156 and tightened the straps either snuggly or tightly, the user can gain immediate release from the half headmount 102 by depressing the release tab 164. Depressing the release tab 164 releases the pressure on the raised tabs of the adjustment tongue 158, thereby allowing the adjustment tongue 158 to exit the occipital buckle 160, which in turn results in a lessening of the tension exerted by the various straps on the user's cranium.

The half headmount embodiment 102 of the half face mask 104 mounts on and is supported by the user's cranium at only the three hardware mounting sites discussed herein where the half face mask 104 contacts and rests upon the user's cranium. Specifically, the half headmount 102 embodiment of the half face mask 104 mounts on the user's cranium at the temporal hardware mounting surface 124, at the cheek hardware mounting surface 128, and at the forehead hardware mounting surface 130. These mounting surfaces 124, 128 and 130 or contact points support the half face mask 104, thereby allowing vision enhancement equipment and communication devices to be mounted to it, and does so without deforming and without resulting in hotspots as discussed herein.

The backside of each of these mounting surfaces 124, 128 and 130 in the half headmount 102 embodiment has corresponding pressure pads. For example, under the temporal hardware mounting surface 124, there is a corresponding temporal pressure pad 115; under the forehead hardware mounting surface 130 there is a corresponding forehead pressure pad 116; and under the cheek hardware mounting surface 128 there is a corresponding cheek pressure pad 120. The pressure pads 115, 116, and 120 are made of the same material, have the same compressive strength and compression setting, are coated with the same coatings, and are attached and removed to the half face mask 114 as the pressure pads 14, 15, 16, 18 and 20 discussed herein. The pressure pads 115, 116 and 120 also relieve pressure and minimize "hot spots" as described herein in regard to pressure pads 14, 15, 16, 18 and 20. It should be noted that any and all of the temporal pads and forehead pads discussed herein can be fabricated and attached to the masks as a single pad.

Figure 11A:
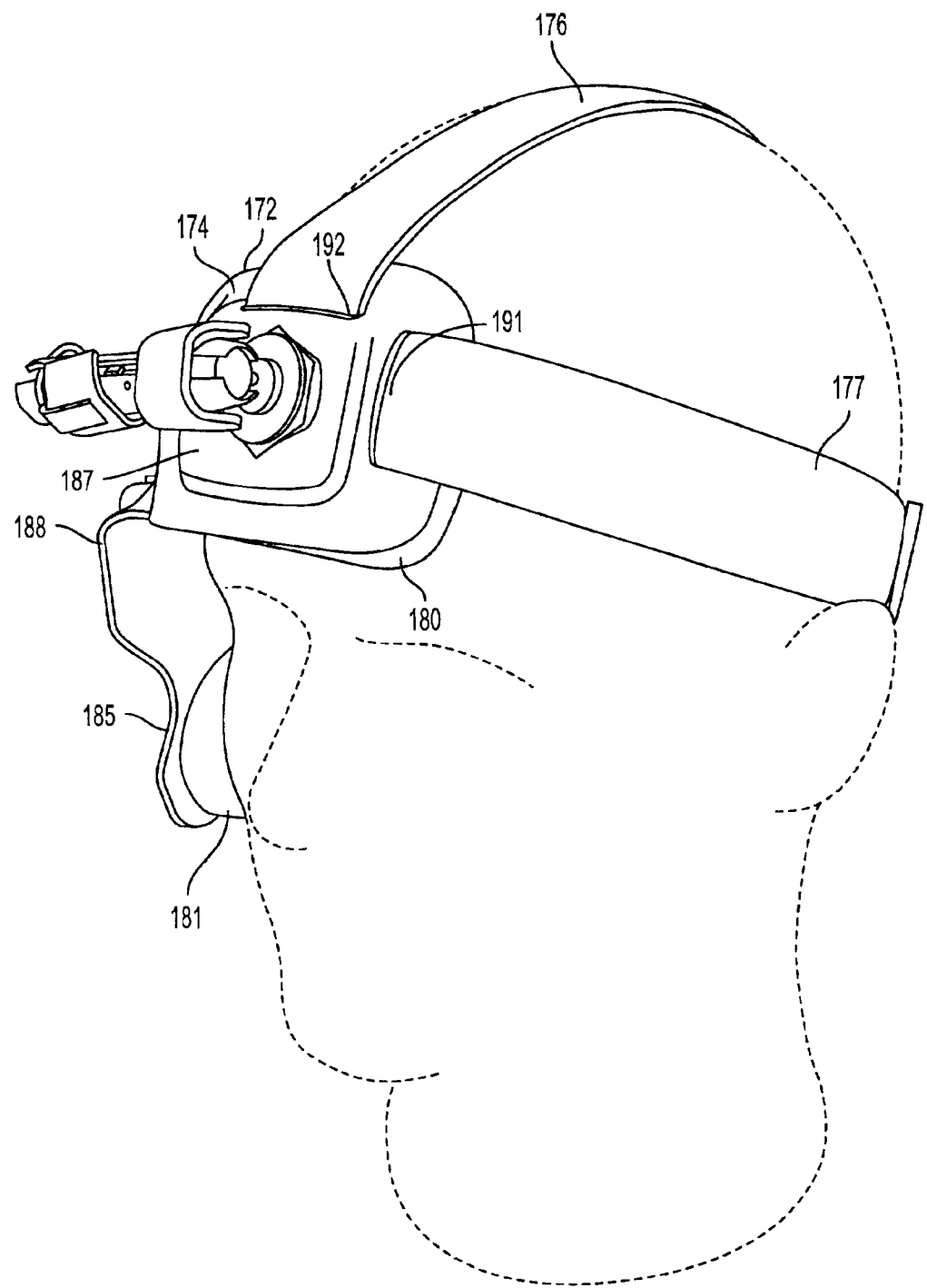
FIG. 11A depicts an angled side view of the half head embodiment with elastic straps.
Figure 11B:
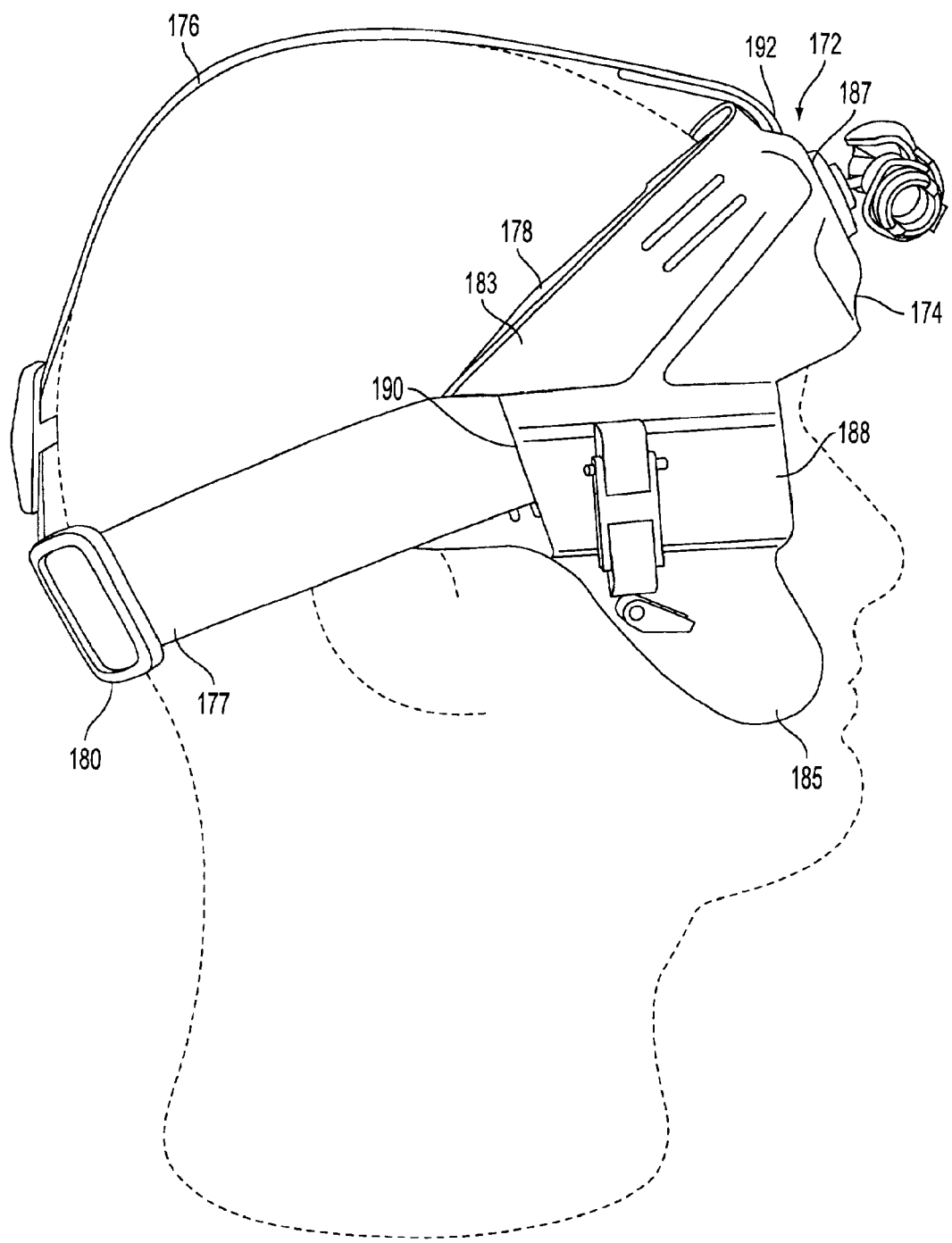
FIG. 11B depicts a side view of the half head embodiment with elastic straps.
Figure 11C:
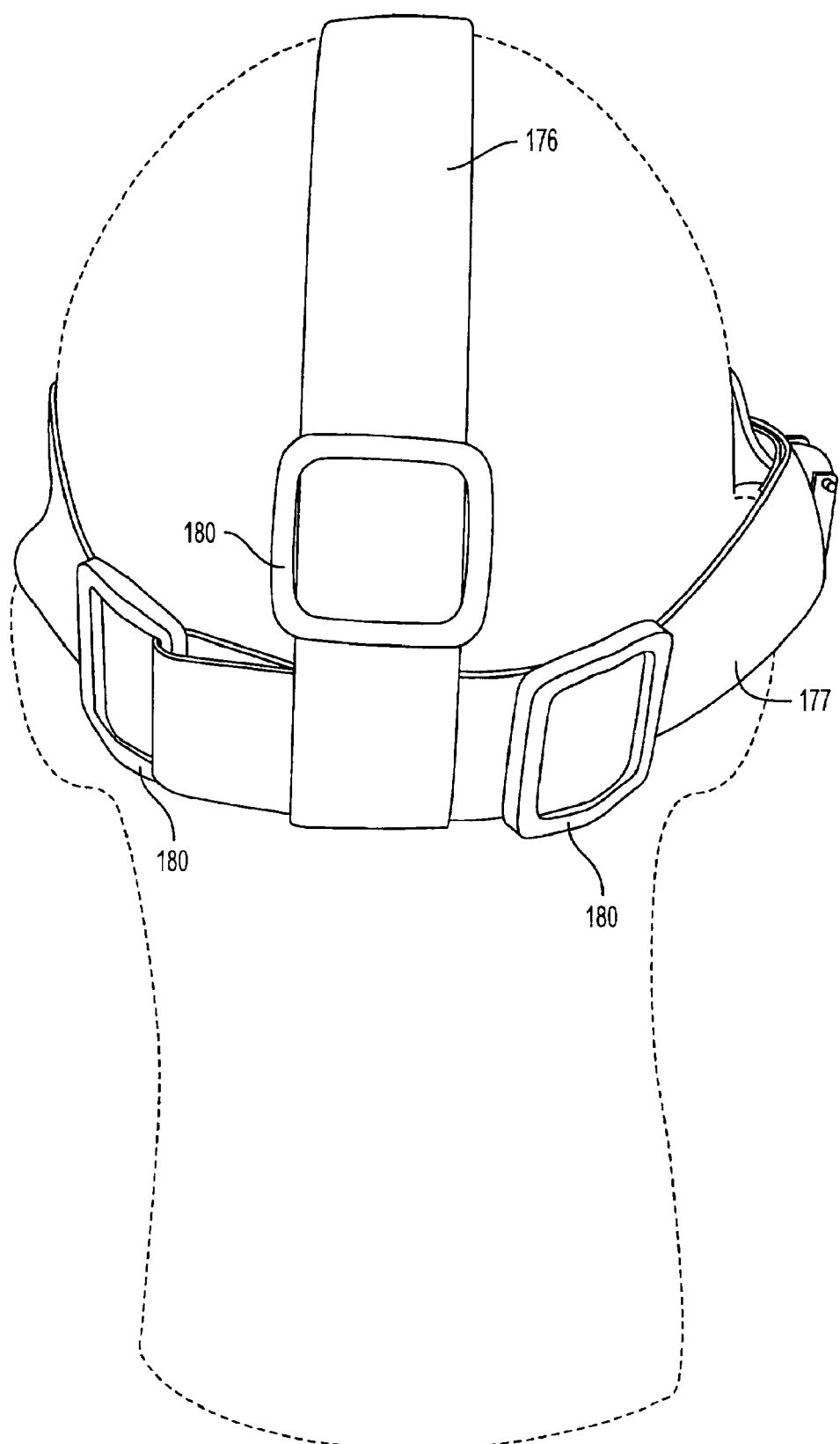
FIG. 11C depicts a rear view of the half head embodiment with adjustment buckles.

An alternative half headmount embodiment 172 is shown in FIGS. 11A–11C, in which the half face mask 174 is the same as the half face mask 104 described above, but the straps differ and the occipital assembly is eliminated. Specifically, the half headmount 172 embodiment is comprised of a half mounting shell or half face mask 174, a top strap 176, a side strap 177, and pressure pads including a temporal pressure pad 178, a forehead pressure pad 180 and a cheek pressure pad 181. The half face mask 174 consists of a temporal hardware mounting surface 183, the cheek hardware mounting surface 185, the forehead hardware mounting surface 187, the eyewear bridge 188 which can also accommodate the mounting of hardware, a temporal double-eyelet 190, a forehead double-eyelet 191 and a frontal double-eyelet 192.

The half face mask 174 in FIG. 11 is similar to the half face mask 104 described above in terms of materials, construction, points of contact, rigidity, padding, etc., except that it only has three points of attachment for the straps. For purposes of illustration the side strap 177 begins by being looped through the temporal double eyelet 190, is wrapped around the user's head, and ends in the forehead double eyelet 191. Although the temporal double-eyelet 190 and the forehead double-eyelet 191 offer both ends of the side strap 177 a point of adjustment, the side strap 177 could also be cut to fit a certain class or size of craniums and then be permanently fixed to the half face mask 174 by any method discussed herein.

The top strap 176 begins in the frontal double-eyelet 192 and ends by being attached to the side strap 177 in any number of ways. For example, as disclosed herein the top strap 176 could be stitched to the side strap 177, or similar to that shown in FIG. 11C the top strap 176 could be looped around the side strap 177, and then stitched back onto itself so that the side strap 177 and top strap 176 can move independent of each other. The tightness of the top strap 176 and the side strap 177 can also be adjusted by employing a doublet buckle 180 as shown in FIGS. 11B and 11C. This doublet buckle 180, which should be as thin as possible to minimize interference with other headgear, can also be employed with the full head embodiment 172 discussed herein. Although the frontal double-eyelet 192 also provides the top strap 176 with a point of adjustment as discussed above, the top strap 176 could also be directly attached to the half face mask 174 by any method discussed herein.

Another difference between the above described half headmount 102 discussed above, and the half headmount 172 disclosed in FIG. 11A through FIG. 11C is that the top strap 176 and the side strap 177 are made of stretchable and/or breathable material, such as lycra or a perforated neoprene. Using such stretchable material has several advantages, including increasing the number of head sizes that can use a given class of half headmounts 172. It also provides a snugger fit to the user's head without resorting to adjusting the straps 176 and 177 in the respective double-eyelets 190, 191 and 192. In fact, the very nature of the lycra or perforated neoprene material could allow for the elimination of the temporal double eyelet 190, the forehead double eyelet 191, and the elimination of the frontal double-eyelet 192 because the straps 176 and 177, after being permanently attached to the half face mask 174, would simply stretch on the user's head to provide a snug fit. Such a snug fit is enhanced by the fact that the half face mask is anthropometric, thereby allowing it to flex open and fit snugly on the user's cranium.

However, if the eyelets are employed the user achieves a tight fit on their head by placing the full headmount 172 on his head and adjusts the top strap 176 and the side strap 177 by pulling on the loose ends of each strap that emerge from the frontal double-eyelet 192, the temporal double-eyelet 190 and the forehead double-eyelet 191. Once adjusted, the half headmount 172 embodiment is ready to allow the user to wear the full headmount 172 during light maneuvers without it moving around on his head. Additionally, the user can use the half headmount 172 to mount lightweight vision enhancement devices, such as microscopic lenses, which are used in situations where the user is not performing vigorous maneuvers, such as a surgeon performing microscopic surgery, or a computer user viewing a miniaturized display.

By eliminating the occipital assembly from the half headmount 172 embodiment, and employing only thin flexible straps made of lycra or perforated neoprene, the interference between the half headmount 172 and other protective head gear worn by the user, such as a helmet and its associated conventional harness, is minimized or even eliminated.

Figure 12B:
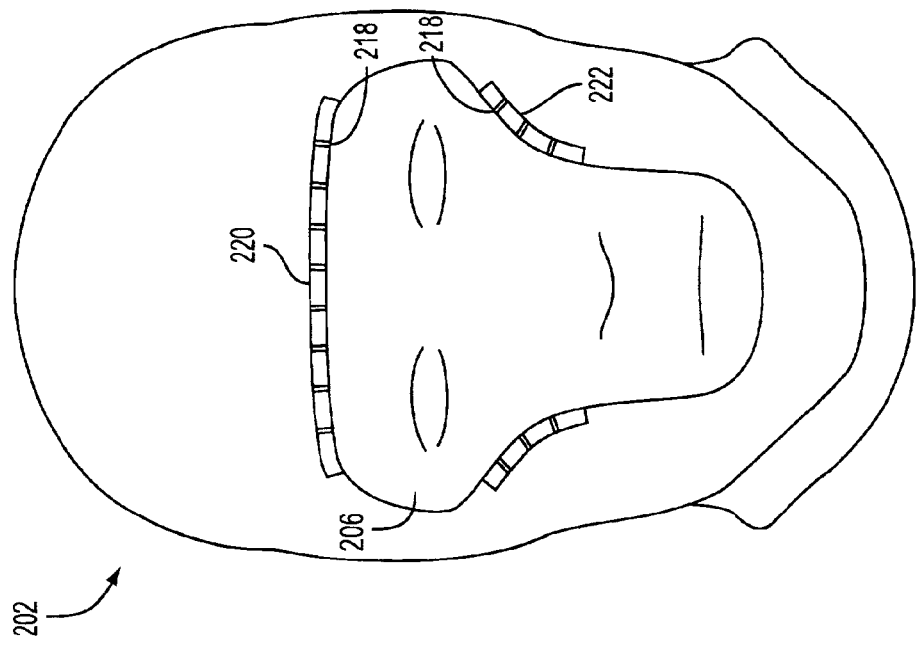
FIG. 12B depicts a front view of the hood headmount.
Figure 12A:
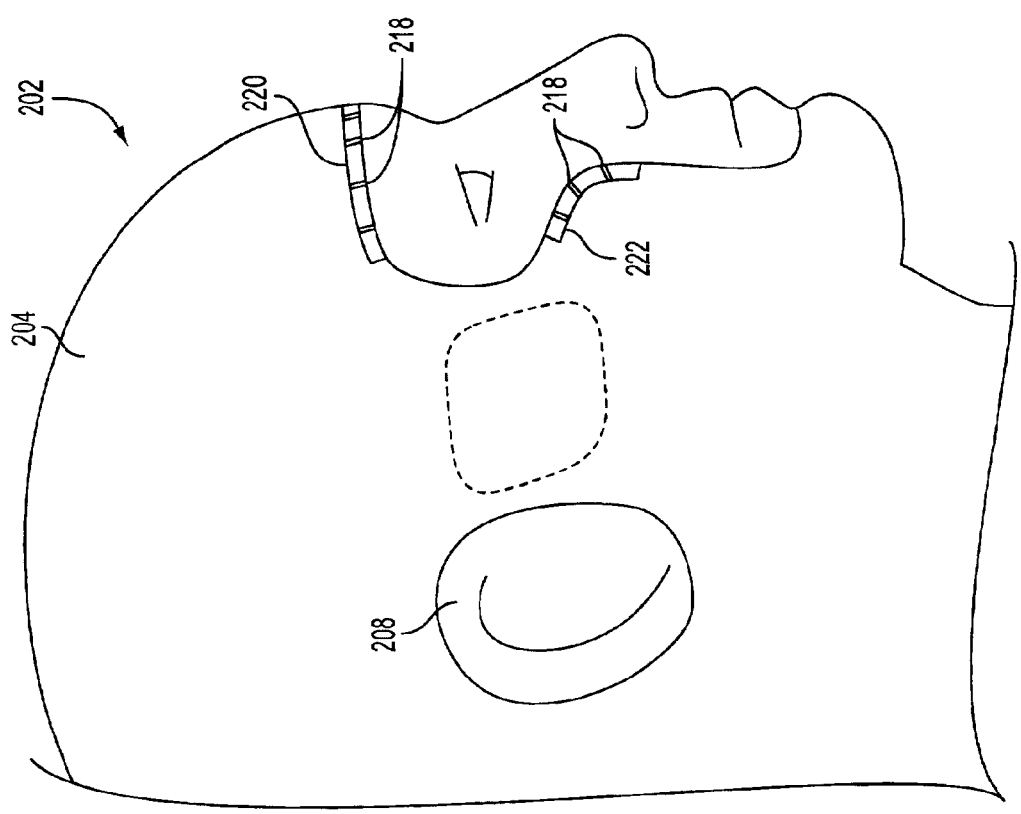
FIG. 12A depicts a side view of the hood headmount.

FIGS. 12A and 12B show an additional full headmount embodiment 202 that differs from the embodiments discussed herein in that it is comprised of a hood 204 instead of a face mask that is kept in place with straps. FIGS. 12A and 12B show a side view and a frontal view, respectively, of the hood embodiment 204 which encloses the user's entire head, and which may or may not cover the user's neck region. The hood embodiment 204 contains a cut out facial area 206 for exposing the user's eyes, mouth and the nasal protuberance, and a cut out aural area 208 that exposes the user's ears. Because the hood 204 is made of a stretchable and/or breathable material such as lycra or a perforated neoprene, it maintains its position on the user's cranium by simple friction. Consequently, it eliminates the buckles, eyelets and/or strap endings found in other headmounts.

The underside of the borders to the cut out areas 206 and 208 are covered by a soft conformal foam pad similar to the pads discussed herein, in that the pad is coated with a moisture wicking material, and coated with a rot inhibitor. More particularly, the underside of the hood embodiment 204 which directly contacts the user's face, aural area, and/or head contains a single, roughly oval shaped pad, which circumscribes the underside of the hood 204. This pad is attached to the inside of the hood 204 by any method described herein or known in the art, including gluing, stitching, VELCRO (hook and loop fasteners), etc.

Figure 13:
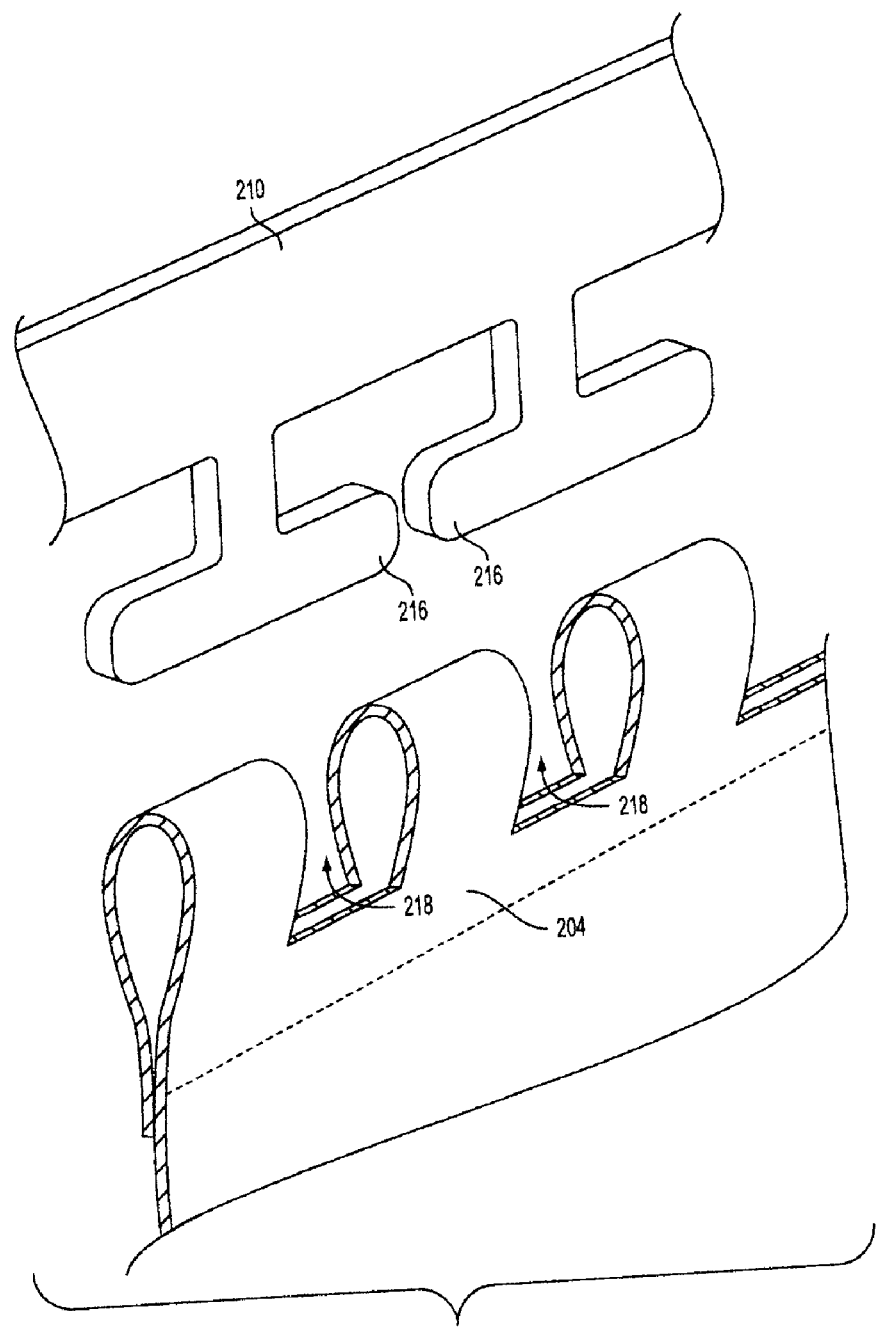
FIG. 13 depicts an angled front view of the mounting frame and hardware mounting surface.

As shown in FIGS. 12A, 12B, 13 and 14, the hood 204 is a platform for receiving a mounting frame 210. This mounting frame can either be mounted in the forehead hardware mounting surface 220, or mounted in the cheekbone hardware mounting surface 222. Because the mounting frame 210 is made of molded thermoplastic or similar elastomer, the lens notch 212 in the mounting frame 210 is flexible and accepts and holds in place the vision enhancement lens and/or vision protection lens 214 employed by the user. The mounting frame 210 also contains multiple mounting tabs 216 which are inserted into and held in place by the corresponding multiple mounting slots 218 located along the forehead hardware mounting surface 220, and/or along the cheekbone hardware mounting surface 222. Each mounting slot 218 is formed by first folding the hood material back onto itself and stitching it in place resulting in a hem, and then cutting out a portion of the folded hem material to result in the mounting slot 218 as shown in FIG. 13. The mounting slot could also be created by any other method known in the art.

Figure 14:
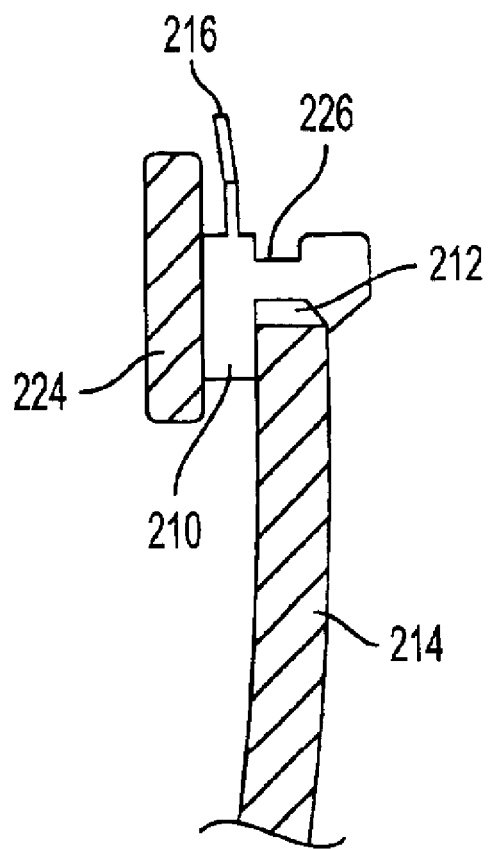
FIG. 14 depicts a side view of the mounting frame and mounted lens.

As shown in FIG. 14 the mounting frame 210 also contains a foam backing 224, similar in compression, coating etc. to the padding described herein for relieving pressure against the user's forehead, and contains an insert groove 226 for accepting a corresponding insert attached to a vision head-mounted display or night vision device. Inserting a corresponding insert attached to the vision head-mounted display or night vision device into the insert groove 226 allows the head-mounted display or night vision device to be suspended in front of the user's eye(s). The insertion of the mounting tabs 216 into the mounting slots 218 provides the forehead hardware mounting surface 220 and the cheekbone hardware mounting surface 222 enough rigidity to mount and keep in place the various head-mounted vision enhancement and communication hardware employed by the various user groups discussed herein.

By allowing the vision assist devices to receive support from the forehead hardware mounting surface 220 or the cheekbone hardware mounting surface 222, or both, a vision assist device which is heavier than a pair of safety glasses (e.g., a night vision device) can be adequately supported, thereby reducing or eliminating movement of the vision assist device in front of the user's eye. Doing so also allows the mounting of such heavier equipment without requiring that it be cantilevered in front of the user's face. Although the forehead hardware mounting surface 220 as depicted in FIG. 12B runs the length of the user's eyebrows, it has no fixed length. Similarly, although the cheekbone hardware mounting surface 222 is depicted in FIGS. 12A and 12B as running approximately the length of the user's cheekbone, it also has no fixed length.

All the inventive headmount embodiments discussed herein all overcome many of the problems associated with the prior art headmounts. For example, the use of all the differing types of straps discussed herein, as well as the hood embodiment eliminate the use of a conventional harness which tightly grabs the user's head so as to bind the platform to the user's head, resulting in pain to the user. Eliminating the conventional harness not only eliminates the pain associated with its use, it also eliminates the need to tightly bind the harness to the user's head so as to maintain the position of the vision enhancing device in front of the user's eye(s). The thinness of those same straps and buckles, as well as the thinness of the hood also serve to eliminate the bulkiness of conventional headmount equipment. Accordingly, the thin straps allow the various embodiments discussed above to be compatible with other head-mounted equipment, such as helmets.

Prior to using the full and half headmount embodiments discussed herein, the user would adjust and set the tension of the straps before placing the convention harness on their head. Although the initial use of the full head and the half head embodiments still require a conventional trial and error method of strap adjustment via eyelets and doublet buckles for user accommodation, after this one time setting, donning and doffing of these headmount embodiments is easy, placement of the device is repeatable, and the tension of the straps is immediately set to the user's liking. By setting the tension of these straps prior to placing the full head embodiments or the half head embodiments on their head, the user eliminates the problems associated with use of the conventional headmounts, such as positioning the platform with one hand while roughly adjusting the straps with the other, and then employing both hands to finely adjust the tension and length of all the straps until the harness is properly fitted. Instead, with the inventive full headmount and the half headmount embodiments discussed herein, the user can roughly set the tension in the straps while it is on their head by simply using one hand to pull on the appropriate straps in combination with either eyelets or doublet buckles. And then to finely set the tension in the straps simultaneously, the user simply feeds the adjustment tongue into the occipital buckle as described herein. Advancing the adjustment tongue through the occipital buckle via the adjustment lever respectively, results in even finer tuning of either the full headmount or the half headmount embodiments.

Certain embodiments discussed herein rely on double-eyelets to adjust the tension in the straps, instead of employing buckles. Eliminating the buckles also eliminates the discomfort and problems sometimes associated with using such buckles.

Moreover, because the full headmount, the half headmount and the full head hood embodiments use such a thin material in the straps or in the hood, those embodiments do not interfere with the helmet's suspension system, as does the harness of conventional headmount equipment. Eliminating this interference also eliminates the associated hotspots commonly caused by such harnesses. Eliminating the interference between the top straps or the hood, and the helmet's suspension system also eliminates the problem of attaining and maintaining the proper adjustment of the helmet in conjunction with the headmount equipment.

The eyewear bridges discussed herein are designed to allow vision assist devices to be mounted directly to them by any means known in the art. Additionally, the eyewear bridges discussed herein are compatible with the user's vision enhancement or protection equipment because the eyewear bridges provide enough space under the respective face mask to allow the arms of the protective eyewear to wrap around the user's cranium. By not forcing the arms of the protective eyewear over the respective face mask, the arms of the protective eyewear fit much more snuggly against the user's head. This results in the eyewear being much more stable on the user's head. Similarly, the hood embodiment not only also allows for the use of eyewear, it actually aids in its stability. For example, because the hood is made of a flexible material, it allows the arms of the eyewear to slide under the hood. And because that same material is compressive, it actually holds the arms of the eyewear in place against the user's head.

Moreover, because the forehead hardware mounting surfaces as well as the cheek hardware mounting surfaces are recessed from the frontal portion of the user's face as shown in at least FIGS. 1–3, 8–9, 11A–11B and 12A–12B, especially in regard to the user's mouth region, the embodiments described herein overcome the short comings of the conventional headmounts by allowing for the use of communication devices or breathing apparatus while simultaneously wearing the headmount equipment. Similarly, because the forehead hardware mounting surfaces as well as the cheek hardware mounting surfaces are recessed from the frontal portion of the user's face as shown in at least FIGS. 1–3, 8–9, 11A–11B and 12A–12B, especially in regard to the user's visual region, the embodiments described herein overcome the short comings of the conventional headmounts by eliminating the extension of the headmount into the user's field of vision, thereby offering the user a full field of view.

Another situation in which constriction of the user's cranium might occur, along with the resulting discomfort and pain, arises when the user's conventional headmount equipment prevents the expansion of the cranium during not only hot weather, but in response to the user expending physical energy. Similarly, conventional headmount equipment will not contract along with the cranium when the cranium cools during colder weather. Therefore, as the cranium cools and contracts the typical headmount loosens and allows the headmount equipment to move out of place. However, the full head embodiments, the half head embodiments, and the hood embodiments all serve to counteract these deleterious side effects caused by wearing conventional headmount equipment. For example, the pads in all the embodiments have some degree of compression set, and will expand or contract against the user's cranium as needed so as to ensure a tight fit of the inventive embodiments to the user's cranium. Similarly, because both the elastic straps and the hood are comprised of lycra, perforated neoprene or similar elastic materials, all will expand or contract in relation to the user's cranium so as to maintain a tight or snug fit without causing any pain or discomfort to the user. By eliminating the user's motivation for removing the headmount embodiments, the user will increase the amount of time they actually use the inventive headmount embodiments described herein.

It will be appreciated by those of ordinary skill in the art of the present invention that it may comprise a variety of different components and/or configurations. Separate devices may be used to implement each function. According to such an embodiment of the invention, a combination of the hood embodiment and the half headmount embodiment may be configured to implement the various aspects of the invention. Other components, configurations, or combinations thereof may also be used.

The present invention has been described in reference to a headmount device for vision enhancing devices used by, for example, combat ground troops. However, the headmount embodiments disclosed herein can also be used for mounting other types of devices that aid the user in situations involving: ground support personnel; fixed wing aviation; rotary aircraft aviation; aviation ground support personnel; utility vehicle transport; armor vehicle transport; security/military police; law enforcement and SWAT operations; devices used by sportsmen, boaters and commercial fisherman including navigational and fish finding devices; commercial maintenance; devices used in virtual reality entertainment and virtual reality training; as well as by surgeons using microscopic lenses or surgical positioning equipment.

These and other embodiments and uses of the invention will be apparent to those skilled in the art from consideration of the specification and practice of the invention disclosed herein. The specification and examples should be considered exemplary only.

We claim:

1. A headmount apparatus to be worn by a subject and for mounting and supporting vision enhancement equipment, the headmount apparatus comprising:

a mounting shell having at least one pad configured to engage the head of the subject and having at least one mounting surface to which the vision enhancing equipment is mounted, the mounting shell being further configured to be substantially open at the top and rear of the subject's head when worn, at least a portion of the pad adapted to contact the cheek area of the subject when worn;

at least one elastic strap attached to the mounting shell for securing the mounting shell to the user's head; and the at least one elastic strap further includes at least one side strap positioned on one side of the user's head, the side strap beginning at the mounting shell, passing through an occipital assembly, and ending at the mounting shell on the one side.

2. The headmount apparatus according to claim 1, wherein the mounting shell is at least in part adapted to match the contours of a typical class of user's head so that it rests on and is supported by the portion of the typical class of user's head with which it comes into contact.

3. The headmount apparatus according to claim 2, wherein the mounting shell is comprised of a rigid material that supports the mounted vision enhancing equipment without deforming from the weight of the vision enhancing equipment.

4. The headmount apparatus according to claim 3, wherein the mounting shell is further comprised of a plurality of contact points between the mounting shell and the user's head to further support the mounted vision enhancing equipment so as to prevent the mounting shell from deforming from the weight of the vision enhancing equipment.

5. The headmount apparatus according to claim 4, wherein the plurality of contact points include at least a cheek contact point, a forehead contact point, and a temporal contact point.

6. The headmount apparatus according to claim 5, wherein the at least one pad is positioned at the plurality of contact points and is compliant so as to conform to the user's head.

7. The headmount apparatus according to claim 6, wherein the at least one pad is coated with a moisture wicking covering.

8. The headmount apparatus according to claim 6, wherein the at least one pad is coated with a rot inhibitor.

9. The headmount apparatus according to claim 1, wherein the at least one strap further includes a top strap which sits atop the user's head and at least one side strap positioned on one side of the user's head, whereby the top strap and the at least one side strap meet at the back of the user's head and act in concert with each other so as to allow the adjust of the tension in the top strap and the tension in the at least one side strap.

10. The headmount apparatus according to claim 9, wherein the tension in the top strap is adjusted by looping it through a frontal double-eyelet in the mounting shell, and the tension in the at least one side strap is adjusted by looping it through at least one double-eyelet in the mounting shell.

11. The headmount apparatus according to claim 10, wherein the top strap and the at least one side strap are further comprised of an elastic material which conforms to the user's head.

12. The headmount apparatus according to claim 11, wherein the tension in the top strap and the at least one side strap are adjusted by manipulating a doublet buckle.

13. The headmount apparatus according to claim 12, wherein the top strap, the at least one side strap, and the doublet buckle are thin enough so as to not interfere with other protective headwear.

14. The headmount apparatus according to claim 1, wherein the mounting shell is further comprised of at least one eyewear bridge for accommodating the arms of eyewear.

15. The headmount apparatus according to claim 14, wherein the at least one mounting surface includes a foreheadmount surface, a temporal mounting surface, an eyewear bridge mounting surface, and a cheek mounting surface to which the vision enhancing equipment is mounted.

16. The headmount apparatus according to claims 8, 13 or 15, wherein the mounting shell is a full face mask.

17. The headmount apparatus according to claims 8, 13 or 15, wherein the mounting shell is a half face mask.

18. The headmount apparatus according to claim 1, wherein the at least one side strap is constructed from a single piece of material.

19. The headmount apparatus according to claim 1, wherein the mounting shell includes a temporal eyelet and a cheek eyelet, the at least one side strap beginning at the temporal eyelet, passing through the occipital assembly and ending at the cheek eyelet.

20. The headmount apparatus according to claim 19, wherein the occipital assembly includes an eyelet, the at least one side strap passing through the eyelet in the occipital assembly.

21. The headmount apparatus according to claim 14, wherein the mounting shell includes contours that demarcate the at least one eyewear bridge.

* * * * *